US012647259B2

(12) United States Patent
Krastanov et al.

(10) Patent No.: US 12,647,259 B2
(45) Date of Patent: Jun. 2, 2026

(54) ROOM-TEMPERATURE COHERENT SPIN-PHOTON INTERFACE AND PROGRAMMABLE SPIN ARRAYS FOR SCALABLE QUANTUM REPEATERS

(71) Applicant: Massachusetts Institute of Technology, Cambridge, MA (US)

(72) Inventors: Stefan Ivanov Krastanov, Boston, MA (US); Hamza Raniwala, Cambridge, MA (US); Hanfeng Wang, Cambridge, MA (US); Matthew Edwin Trusheim, Cambridge, MA (US); Laura Kim, Belmont, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 651 days.

(21) Appl. No.: 18/146,085

(22) Filed: Dec. 23, 2022

(65) Prior Publication Data

US 2023/0208628 A1     Jun. 29, 2023

Related U.S. Application Data

(60) Provisional application No. 63/323,763, filed on Mar. 25, 2022, provisional application No. 63/293,479, filed on Dec. 23, 2021.

(51) Int. Cl.
H04L 9/08          (2006.01)
(52) U.S. Cl.
CPC ................................... H04L 9/0855 (2013.01)
(58) Field of Classification Search
None
See application file for complete search history.

(56) References Cited

U.S. PATENT DOCUMENTS 7,432,775 B2 * 10/2008 Dutta ........................ H01P 3/08
                                                        257/E23.173
11,730,067 B2 * 8/2023 Orcutt .................. H10N 60/805
                        (Continued)

FOREIGN PATENT DOCUMENTS

CN          111504884 A  *  8/2020  ......... G01N 15/1031
CN          112925145 A  *  6/2021  ............. G02F 1/353
                        (Continued)

OTHER PUBLICATIONS

Burek et al. "A fiber-coupled diamond quantum nanophotonic interface." arXiv:1612.05285, 33 pages (Year: 2017).*
                        (Continued)

*Primary Examiner* — Robert H Kim
*Assistant Examiner* — Alina Kaliszewski
(74) *Attorney, Agent, or Firm* — Smith Baluch LLP

(57)          ABSTRACT
A 1D diamond nanobeam can act as a coherent mechanical interface between spin defect centers in diamond and telecom optical modes. The nanobeam includes embedded mechanical and electric field concentrators with mechanical and optical mode volumes of $$V_{mech}/\Lambda_p^3 \sim 10^{-5}$$

and $V_{opt}/\lambda^3 \sim 10^{-3}$, respectively. With a Group IV vacancy in the concentrator, the nanobeam can operate at spin-mechanical coupling rates approaching 40 MHz with high acousto-optical couplings. This nanobeam, used in an entanglement heralding scheme, can provide high-fidelity Bell pairs between quantum repeaters. Using the mechanical interface as an intermediary between the optical and spin subsystems enables addressing the spin defect center with telecom optics, bypassing the native wavelength of the spin. As the (Continued)

spin is never optically excited or addressed, the device can operate at temperatures up to 40 K with no appreciable spectral diffusion, limited by thermal losses. Optomechanical devices with high spin-mechanical coupling can be useful for quantum repeaters.

18 Claims, 21 Drawing Sheets

(56) References Cited

U.S. PATENT DOCUMENTS

| | | | | |
|---|---|---|---|---|
| 2003/0179787 | A1* | 9/2003 | Woodley | H01S 5/141 |
| | | | | 372/20 |
| 2018/0210149 | A1* | 7/2018 | Mahmoodian | G02B 6/1223 |
| 2022/0135409 | A1* | 5/2022 | Schenkel | C09K 11/65 |
| | | | | 428/220 |
| 2022/0308418 | A1* | 9/2022 | Kataoka | G02F 1/2255 |
| 2022/0382082 | A1* | 12/2022 | Simmons | G02F 1/21 |

FOREIGN PATENT DOCUMENTS

| | | | | | |
|---|---|---|---|---|---|
| WO | WO-2021022576 | A1 | * | 2/2021 | H10F 71/00 |
| WO | WO-2023112661 | A1 | * | 6/2023 | H10N 30/20 |

OTHER PUBLICATIONS

Hopper et al. "Spin Readout Techniques of the Nitrogen-Vacancy Center in Diamond." arXiv:1809.05237, 22 pages (Year: 2018).*
Kuzyk et al. "Scaling Phononic Quantum Networks of Solid-State Spins with Closed Mechanical Subsystems." Phys. Rev. X 8, 041027 (Year: 2018).*
Meesala et al. "Strain engineering of the silicon-vacancy center in diamond." Phys. Rev. B 97, 205444 (Year: 2018).*
Cady et al. "Diamond optomechanical crystals with embedded nitrogen-vacancy centers." arXiv:1811.04275, 7 pages (Year: 2018).*
English machine translation for CN-111504884-A (Year: 2020).*
Jeon et al. "Bright Nitrogen-Vacancy Centers in Diamond Inverted Nanocones." ACS Photonics 2020 7 (10), 2739-2747 (Year: 2020).*
Maity et al. "Coherent acoustic control of a single silicon vacancy spin in diamond." Nat Commun 11, 193 (2020). (Year: 2020).*
Neuman et al. "A Phononic Bus for Coherent Interfaces Between a Superconducting Quantum Processor, Spin Memory, and Photonic Quantum Networks." arXiv:2003.08383, 17 pages (Year: 2020).*
Wu et al. "Microwave-to-Optical Transduction Using a Mechanical Supermode for Coupling Piezoelectric and Optomechanical Resonators." Phys. Rev. Applied 13, 014027 (Year: 2020).*
Borregaard et al. "One-Way Quantum Repeater Based on Near-Deterministic Photon-Emitter Interfaces." Phys. Rev. X 10, 021071 (Year: 2020).*
Mirhosseini et al. "Quantum transduction of optical photons from a superconducting qubit." arXiv:2004.04838, 17 pages (Year: 2020).*
English machine translation for WO-2021022576-A1 (Year: 2021).*
Janitz et al. "Cavity quantum electrodynamics with color centers in diamond." arXiv:2101.02793, 23 pages (Year: 2021).*
English machine translation for WO-2023112661-A1 (Year: 2023).*
English machine translation for CN-112925145-A (Year: 2021).*
Ashkin "Trapping of atoms by resonance radiation pressure." Physical Review Letters 40.12 (1978): 4 pages.
Barman et al. "Temperature dependence of the thermal conductivity of different forms of diamond." Journal of Applied Physics 101.12 (2007): 123507, 9 pages.
Berman et al. "The thermal conductivity of diamond at low temperatures." Proceedings of the Royal Society of London. Series A. Mathematical and Physical Sciences 220.1141 (1953): 171-183, 13 pages.
Burek et al. "Diamond optomechanical crystals." Optica 3.12 (2016): 1404-1411.

Cady et al. "Diamond optomechanical crystals with embedded nitrogen-vacancy centers." Quantum Science and Technology 4.2 (2019): 024009, 9 pages.
Chan et al. "Laser cooling of a nanomechanical oscillator into its quantum ground state." Nature 478.7367 (2011): 89-92.
Chan et al. "Optimized optomechanical crystal cavity with acoustic radiation shield." Applied Physics Letters 101.8 (2012): 081115, 5 pages.
Childress Coherent manipulation of single quantum systems in the solid state. Harvard University, 2007 188 pages.
Choi et al., "Self-similar nanocavity design with ultrasmall mode volume for single-photon nonlinearities." Physical Review Letters 118.22 (2017): 223605. 6 pages.
Cuthbertson et al. "Parametric back-action effects in a high-Q cyrogenic sapphire transducer." Review of Scientific Instruments 67.7 (1996): 2435-2442, 9 pages.
Duan et al. "Long-distance quantum communication with atomic ensembles and linear optics." Nature 414.6862 (2001): 413-418.
Duwell et al. "Engineering MEMS resonators with low thermoelastic damping." Journal of microelectromechanical systems 15.6 (2006): 1437-1445, 9 pages.
Eichenfield et al. "Optomechanical crystals." Nature 462.7269 (2009): 78-82.
Eichenfield, et al. "A picogram-and nanometre-scale photonic-crystal optomechanical cavity." Nature 459.7246 (2009): 550-555.
Forsch et al. "Microwave-to-optics conversion using a mechanical oscillator in its quantum ground state." Nature Physics 16.1 (2020): 69-74, 6 pages.
Ghaffari et al. "Quantum limit of quality factor in silicon micro and nano mechanical resonators." Scientific Reports 3.1 (2013): 1-7.
Ghobadi et al. "Progress toward cryogen-free spin-photon interfaces based on nitrogen-vacancy centers and optomechanics." Physical Review A 99.5 (2019): 053825, 5 pages.
Graebner et al. "Dominance of Intrinsic Phonon Scattering in CVD Diamond." Diamond Films and Technology 1.3 (1992) 10 pages.
Hepp et al. "Electronic structure of the silicon vacancy color center in diamond." Physical Review Letters 112.3 (2014): 036405, 5 pages.
Ji et al. "Proposal for room-temperature quantum repeaters with nitrogen-vacancy centers and optomechanics." arXiv e-prints (originally 2020): arXiv:2203.06611v2, revised 2023, 22 pages.
Jiang et al. "Efficient bidirectional piezo-optomechanical transduction between microwave and optical frequency." Nature Communications 11.1 (2020): 1-7.
Johnson et al. "Perturbation theory for Maxwell's equations with shifting material boundaries." Physical Review E 65.6 (2002): 066611, 7 pages.
Krastanov et al. Optically heralded entanglement of superconducting systems in quantum networks),(2021) arXiv:2012.13408 [quant-ph], 10 pages.
Krastanov et al. "Optically heralded entanglement of superconducting systems in quantum networks." Physical Review Letters 127.4 (2021): 040503, 7 pages.
Kunal et al. "Akhiezer damping in nanostructures." Physical Review B 84.24 (2011): 245450, 8 pages.
Lang "The strain-optical constants of diamond: A brief history of measurements." Diamond and Related Materials 18.1 (2009): 1-5.
Maity et al. "Coherent acoustic control of a single silicon vacancy spin in diamond." Nature Communications 11.1 (2020): 1-6.
Maris "Interaction of sound waves with thermal phonons in dielectric crystals." Physical Acoustics. vol. 8. Academic Press, 1971. 279-345, 68 pages.
Meesala et al. "Strain engineering of the silicon-vacancy center in diamond." Physical Review B 97.20 (2018): 205444, 13 pages.
Mirhosseini et al. "Quantum transduction of optical photons from a superconducting qubit." arXiv preprint arXiv:2004.04838 (2020). 17 pages.
Neuman, Tomas, et al. "A phononic bus for coherent interfaces between a superconducting quantum processor, spin memory, and photonic quantum networks." arXiv preprint arXiv:2003.08383 (2020). 17 pages.
Pohl "The applicability of the Debye model to thermal conductivity." Zeitschrift für Physik 176.4 (1963): 358-369, 12 pages.

(56) References Cited

OTHER PUBLICATIONS

Raniwala et al. "A spin-optomechanical quantum interface enabled by an ultrasmall mechanical and optical mode volume cavity." arXiv preprint arXiv:2202.06999 (2022), 13 pages.

Reeber et al. "Thermal expansion, molar volume and specific heat of diamond from 0 to 3000K." Journal of Electronic Materials 25.1 (1996): 63-67, 5 pages.

Ren et al. "Two-dimensional optomechanical crystal cavity with high quantum cooperativity." Nature Communications 11.1 (2020): 1-10.

Riedinger et al. "Remote quantum entanglement between two micromechanical oscillators." Nature 556.7702 (2018): 473-477.

Schmidt et al. "Acoustic diamond resonators with ultrasmall mode volumes." Physical Review Research 2.3 (2020): 033153. 10 pages.

Tabrizian et al. "Effect of phonon interactions on limiting the fQ product of micromechanical resonators." Transducers 2009-2009 International Solid-State Sensors, Actuators and Microsystems Conference. IEEE, 2009. 4 pages.

The CVD Diamond Booklet. Diamond Materials-Advanced Diamond Technology 2021. Accessed at https://login.appcoll.com/GetFile.aspx?id=43393. 28 pages.

Vainsencher et al. "Bi-directional conversion between microwave and optical frequencies in a piezoelectric optomechanical device." Applied Physics Letters 109.3 (2016): 033107, 4 pages.

Wang et al. "Electric-Field Programmable Spin Arrays for Scalable Quantum Repeaters." arXiv preprint arXiv:2204.07051 (2022), 12 pages.

Wilson-Rae et al. "Theory of ground state cooling of a mechanical oscillator using dynamical backaction." Physical Review Letters 99.9 (2007): 093901, 4 pages.

Woodruff et al. "Absorption of sound in insulators." Physical Review 123.5 (1961): 1553, 7 pages.

Wu et al. "Microwave-to-optical transduction using a mechanical supermode for coupling piezoelectric and optomechanical resonators." Physical Review Applied 13.1 (2020): 014027, 30 pages.

Zhong et al. "Entanglement of microwave-optical modes in a strongly coupled electro-optomechanical system." Physical Review A 101.3 (2020): 032345. 9 pages.

* cited by examiner

| $g_{sm}$ profile | f (GHz) | $Q_{mech}$ | $g_{sm}/2\pi$ (MHz) |
|---|---|---|---|
| | 4.91 | $4.6 \times 10^8$ | 20 |
| | 5.34 | $2.5 \times 10^7$ | 40 |
| | 5.79 | $1.6 \times 10^8$ | 12 |
| | 5.85 | $3.7 \times 10^7$ | 16 |
| | 5.95 | $1.5 \times 10^7$ | 20 |

FIG. 4

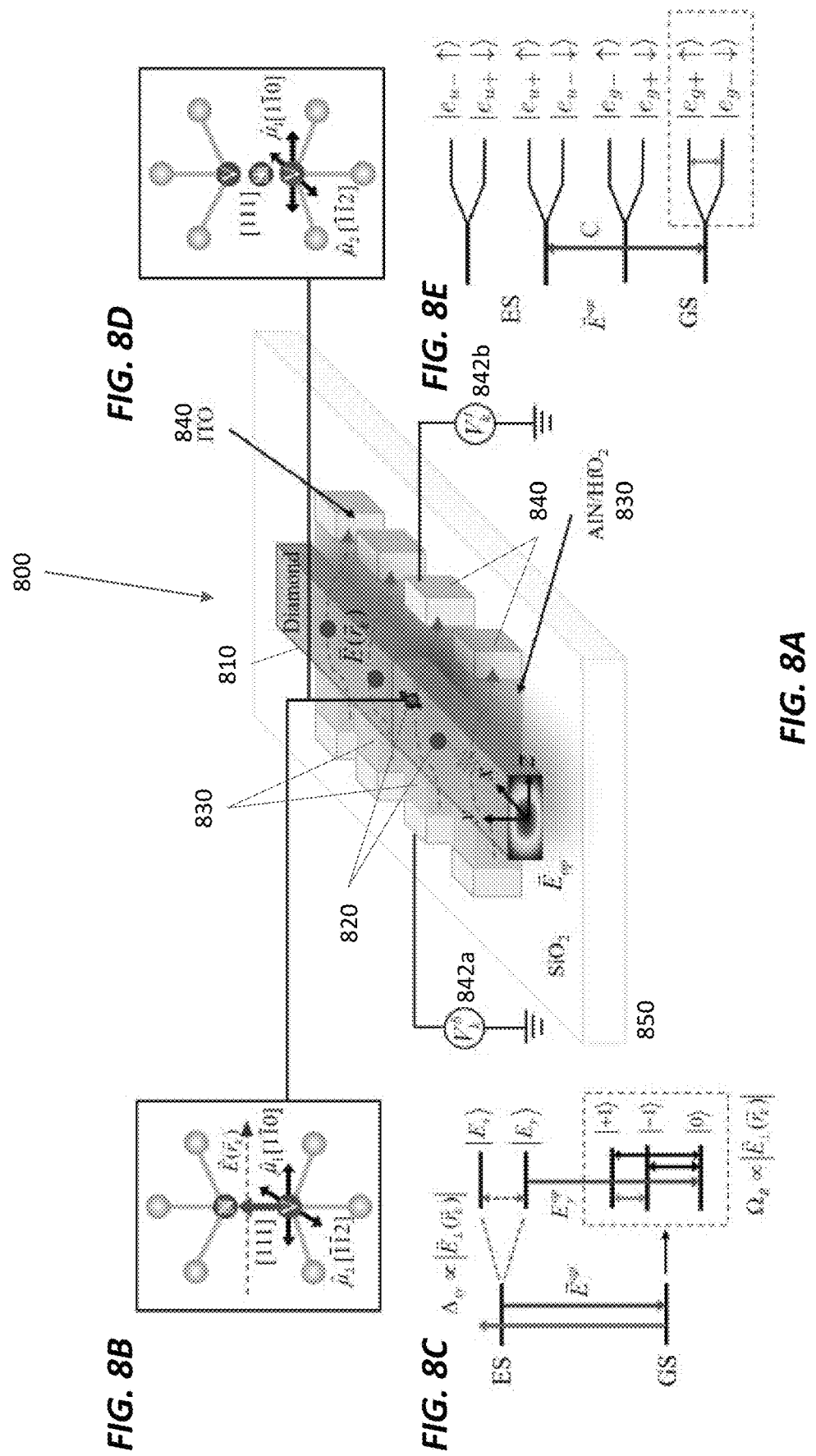

FIG. 11D (a). Two lines   (b). Loop   (c). Loop + Feed lines   (d). Electrode Pair

ROOM-TEMPERATURE COHERENT SPIN-PHOTON INTERFACE AND PROGRAMMABLE SPIN ARRAYS FOR SCALABLE QUANTUM REPEATERS

CROSS-REFERENCE TO RELATED APPLICATIONS

This application claims the priority benefit, under 35 U.S.C. 119(e), of U.S. Application No. 63/323,763, filed Mar. 25, 2022, and entitled "Programmable Spin Arrays for Scalable Quantum Repeaters," and of U.S Application No. 63/293,479, filed Dec. 23, 2021 and entitled "Room-Temperature Coherent Spin-Photon Interface." Each of these applications is incorporated herein by reference in its entirety for all purposes.

GOVERNMENT SUPPORT

This invention was made with government support under PHY1734011 awarded by the National Science Foundation, and under W911NF-18-1-0432 awarded by the Army Research Office. The government has certain rights in the invention.

BACKGROUND

The interaction of light with solid matter via radiation pressure forces is a remarkable phenomenon whose discovery dates back to the 17th century. In recent decades, progress on understanding and engineering this light-matter interaction has produced groundbreaking experiments in cavity optomechanics, including laser feedback cooling, parametric light-matter processes in kilogram-scale and picogram-scale optomechanical systems, and laser cooling of mechanical modes to their ground state. These quantum optics-like experiments have paved the way for optomechanical devices to be used in quantum transduction and entanglement.

Cavity optomechanics in the quantum limit has developed in parallel to solid-state vacancies. Solid-state vacancies are atomic defects in dielectric media, such as diamond, that result from ion implantation into a dielectric lattice. The free electron spins or nuclear spins of the resulting vacancy centers, also called color centers, defect centers, or spin defect centers, in the lattice can be coherently controlled as solid-state quantum bits. Additionally, acoustic control of spin centers has opened the door to multi-modality quantum systems, such as spin-optomechanical interfaces. These complex coupled systems can allow for exciting physics, such as dark-state operation of spin centers, optical-to-spin quantum transduction, and new architectures for quantum repeaters in a quantum network.

SUMMARY

Memories based on color centers, also called vacancy centers, spin defect centers, or defect centers, are typically addressed optically for readout by shining a laser beam with a very specific wavelength on the color center and detecting photons at specific wavelengths coming from the color center. These wavelengths are frequently very inconvenient to work with, e.g., because they are absorbed in standard optical fibers.

A nanobeam photonic crystal, or one-dimensional (1D) optomechanical crystal (OMC), eliminates this problem by first transferring the state of the spin defect center to a mechanical mode of a mechanical resonator, thanks to the strain coupling, and then optically reading out the state of the mechanical mode via an optical resonator that is strain-coupled to the mechanical resonator. The wavelength for optical readout can be tuned by engineering the mechanical and optical resonators in the nanobeam photonic crystal. The interaction between the spin defect center and the mechanical resonator can itself be controlled by tuning the color center in and out of resonance with the mechanical resonator. This can be done with a controllable static magnetic field around the spin defect center.

One way to read out the spin defect center is to shine pump light slightly less energetic than the resonance of the optical resonator on the OMC. Through the optomechanical coupling, a photon of the pump light and a phonon emitted by the color center into a mechanical mode supported by mechanical resonator merge to create one photon in the optical resonator that then leaks out of the optical resonator and is detected. A filter removes excess pump light before it reaches the detector so that the detector senses only resonant photons (created by the sacrifice of mechanical phonons). As an example, if the mechanical resonator resonates at 10 GHz and the optical resonator resonates at 100 THz, then the pump light could be at a frequency of 99.990 THz. The detection of a 100 THz photon would herald the existence of a phonon in the mechanical resonator. Because the source of that phonon is the spin defect center, this scheme enables detection of the state of the spin defect center.

Separately, large-scale control over thousands of quantum emitters, such as color centers or spin defect centers, is limited by power consumption and cross-talk in microwave techniques. Fortunately, these challenges can be addressed by a quantum repeater architecture based on densely packed diamond color centers or spin defect centers between electrodes in a programmable electrode array, with quantum gates driven by electric or strain fields. This field programmable spin array (FPSA) enables high-speed spin control of individual color centers with low cross-talk and power dissipation. Integrated in a slow-light waveguide for efficient optical coupling, the FPSA serves as a quantum interface for optically mediated entanglement. Compared to a routing-tree design, an FPSA can generate entanglement at a higher rate with scaling into the thousand-qubit regime. With this performance, an FPSA enables high-fidelity control of dense quantum emitter arrays for scalable networking.

A field programmable spin array (FPSA) may include a waveguide, an array of color centers formed in the waveguide, an array of electrodes in electromagnetic communication with the array of color centers, an array of dielectric structures between the waveguide and the array of electrodes. In operation, the electrodes to apply electric fields to respective color centers in the array of color centers. And the array of dielectric structures concentrates the electric fields near the respective color centers color.

The waveguide can be a slow-light waveguide. For instance, if the array of dielectric structures is a periodic array of dielectric structures, the waveguide and the periodic array of dielectric structures can form a slow-light photonic crystal waveguide. The waveguide can be a diamond waveguide that hosts an array of nitrogen vacancies.

The electric fields can mediate spin coupling between the color centers and at least one optical mode guided by the waveguide. The electric fields can also enable selective coupling of a mode propagating in the waveguide to a color center in the array of color centers.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The drawings are primarily for illustrative purposes and are not intended to limit the scope of the inventive subject matter. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

versus bridge width for a nanobeam photonic crystal.

Figures 3A, 3B, 3C, 3D, 3E, 3F, 3G:
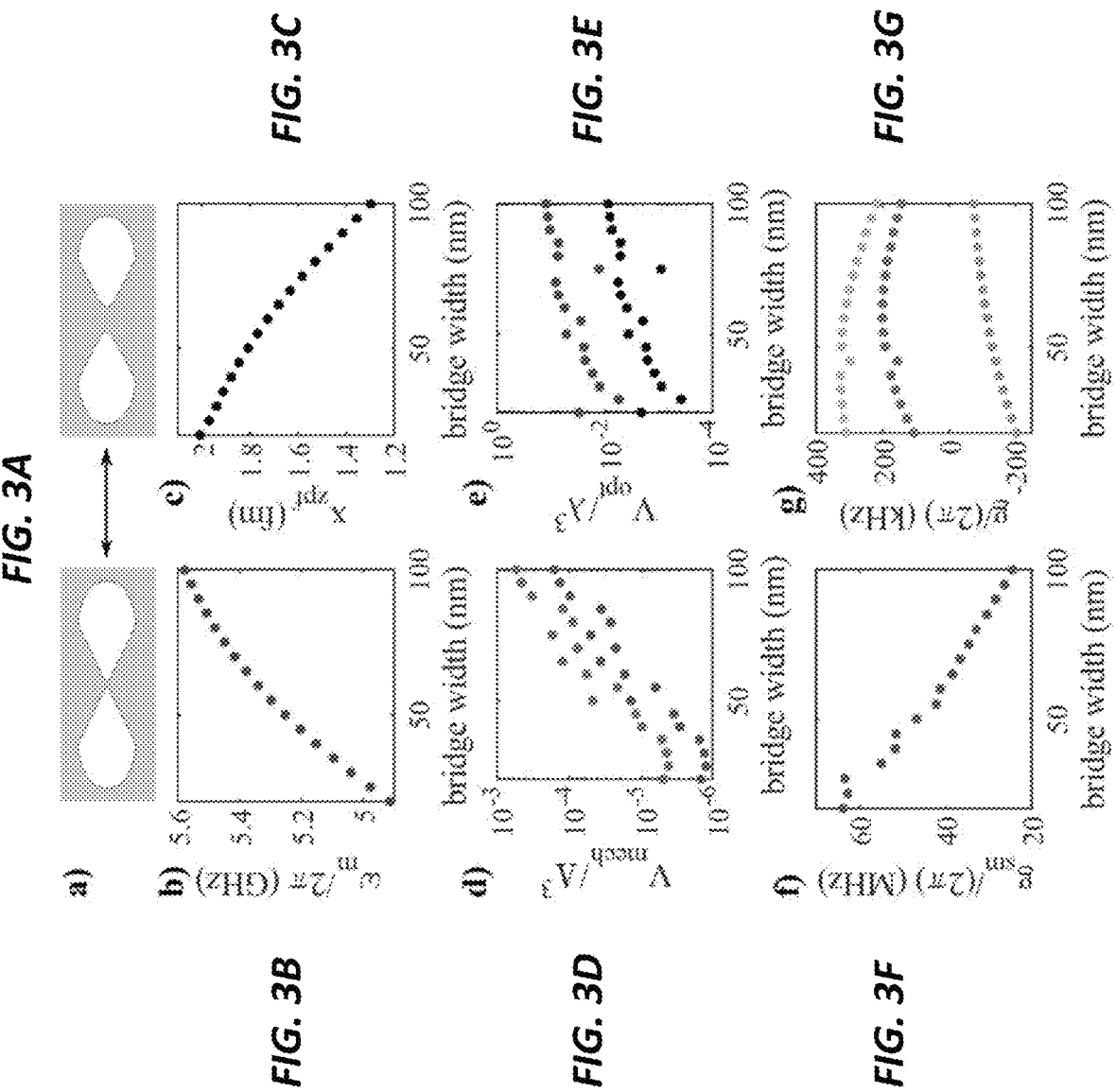
FIG. 3A depicts a bridge width change from 20 nm to 100 nm in a nanobeam photonic crystal.
FIG. 3B is a plot of mechanical resonant frequency versus bridge width for a nanobeam photonic crystal.
FIG. 3C is a plot of zero-point fluctuation versus bridge width for a nanobeam photonic crystal.
FIG. 3D is a plot of mechanical mode volume $$\left(V_{mech}/\Lambda_p^3 - \text{lower points, } V_{mech}/\Lambda_s^3 - \text{upper points}\right)$$

FIG. 3E is a plot of optical mode volume ($V_{opt}/\lambda^3$—lower points, $V_{opt}/(\lambda/n)^3$—upper points) versus bridge width for a nanobeam photonic crystal.

FIG. 3F is a plot of the maximum strain-induced coupling rate $g_{sm}$ versus bridge width for a nanobeam photonic crystal.

FIG. 3G is a plot of optomechanical coupling ($g_{pe}$—upper points, $g_{mb}$—lower points, $g_{om}$—middle points) versus bridge width for a nanobeam photonic crystal.

FIG. 4 is a table showing locations of high strain-induced coupling $g_{sm}$ for various mechanical modes with the frequency, quality factor, and maximal spin-mechanical coupling $g_{sm}$ for each mechanical mode. The left column shows represent the locations of maximized $g_{sm}$. We can select the preferred mode to interact with by its spectral or spatial properties. The thin lines in the plots in the left column represent the diamond walls.

Figure 5:
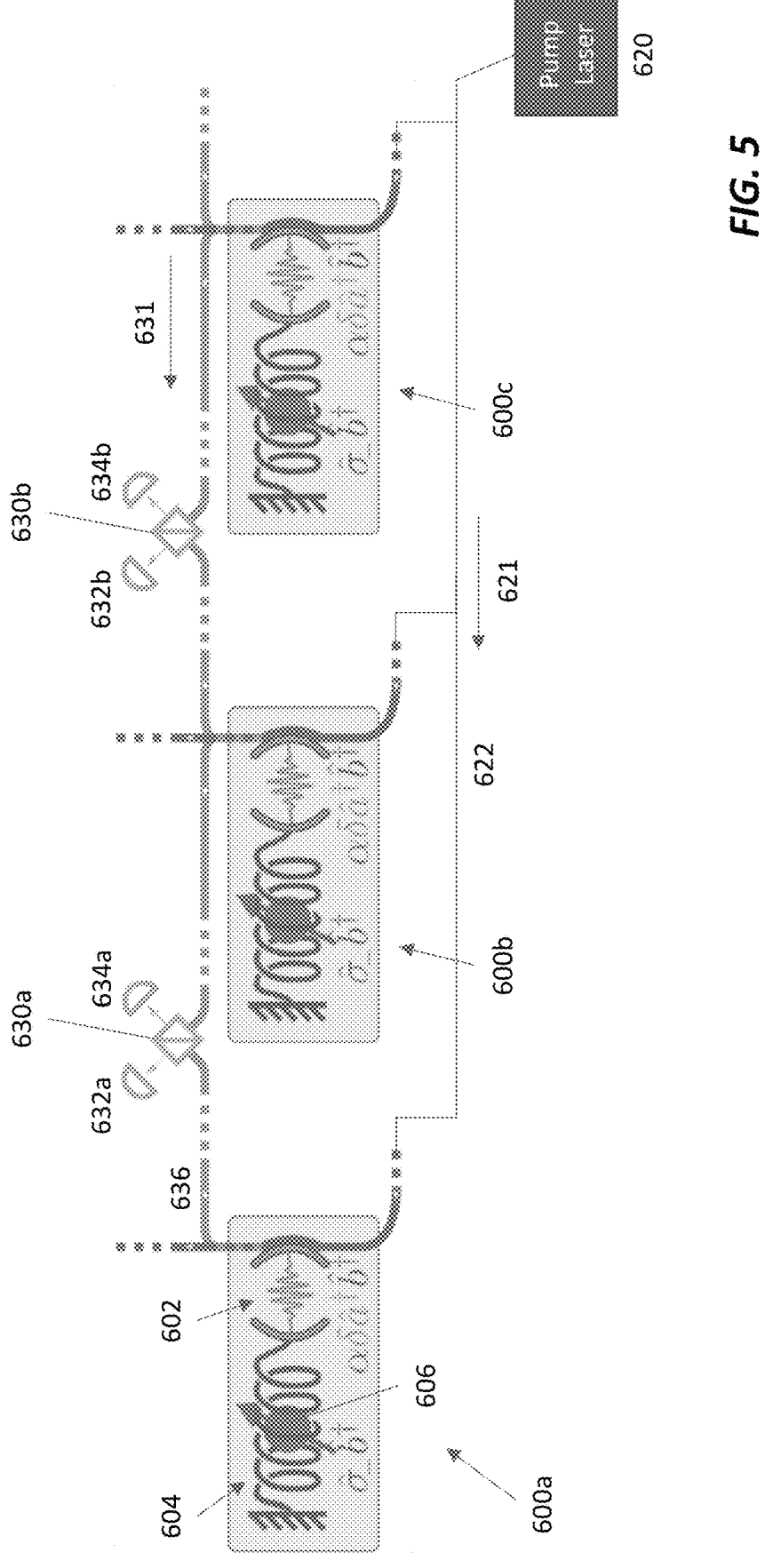

FIG. 5 shows optically coupled optomechanical crystals for carrying out a remote entanglement protocol.

Figure 6:
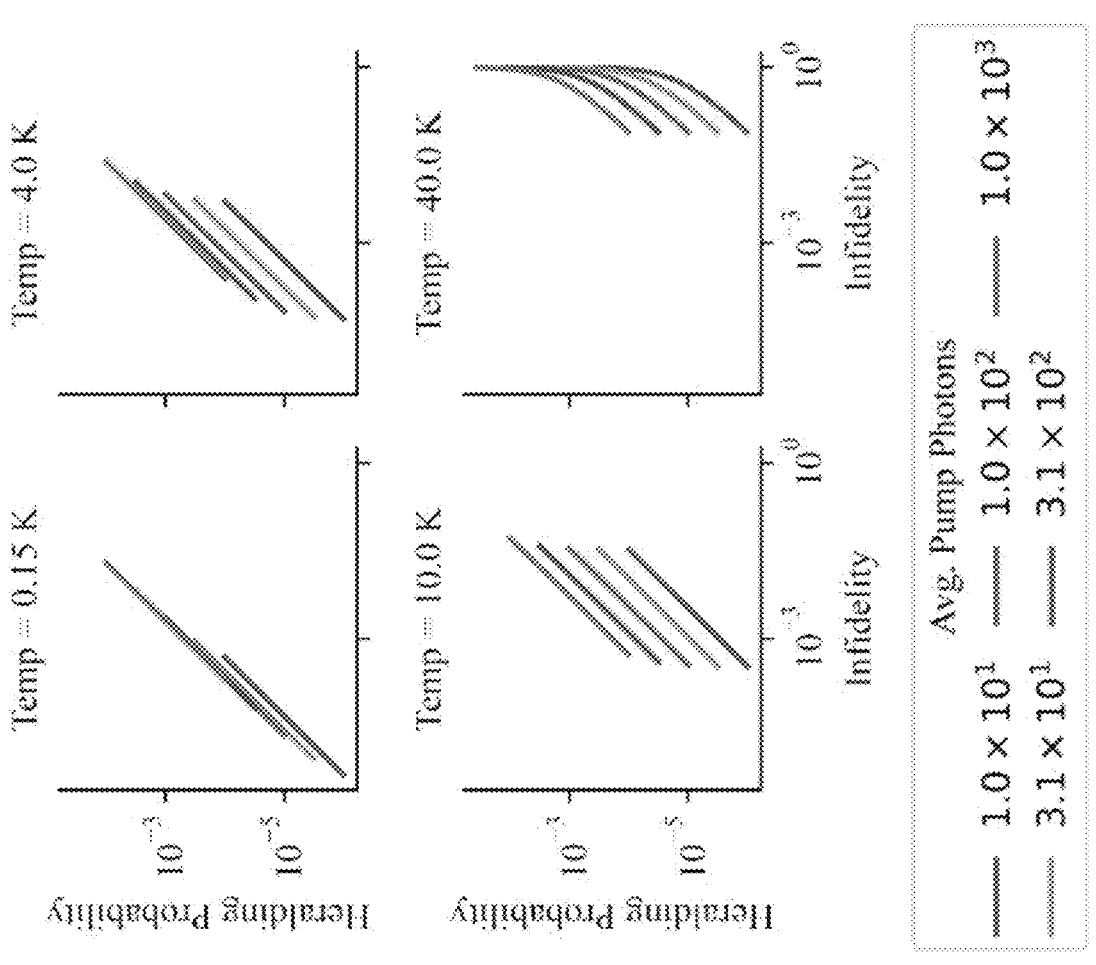

FIG. 6 shows plots of heralding probability versus single-phonon infidelity as a function of temperature (figure quadrant) and pump power (vertical offset), parameterized by pump pulse duration (each trace spans $T=T_a$ to $T=10^3 T_a$).

Figure 7:
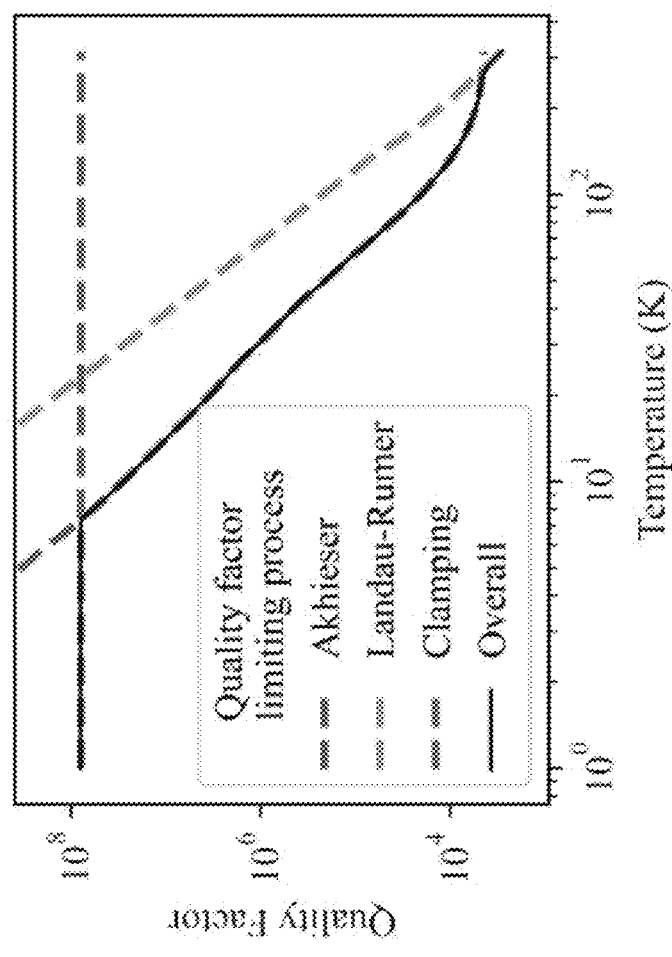

FIG. 7 is a plot of quality factor versus temperature for different processes that limit quality factor.

FIG. 8A shows an exemplary field programmable spin array (FPSA).

FIG. 8B illustrates a nitrogen vacancy (NV) in diamond in the [111] direction and transition dipoles in the $\hat{\mu}_1=[1\bar{1}0]$ and $\hat{\mu}_2=[\bar{1}\bar{1}2]$ directions.

Figures 1A, 1B:
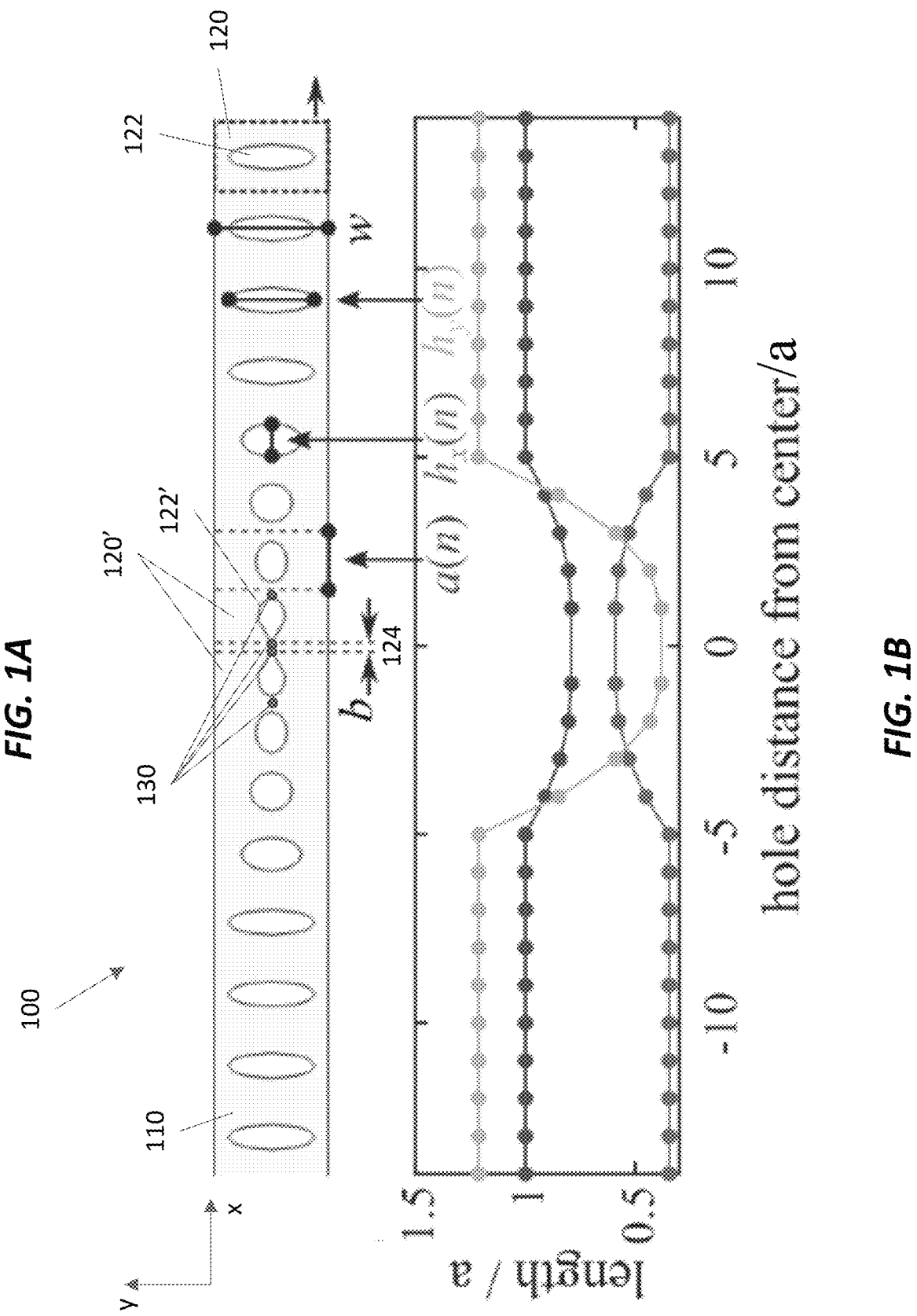
FIG. 1A shows a diamond one-dimensional (1D) nanobeam optomechanical crystal (OMC) with an embedded concentrator, also called a nanobeam photonic crystal, with a taper width b, also called the bridge width; unit cell period as a function of cell number n, a(n); unit ellipse width $h_x(n)$ and height $h_y(n)$; and beam width w alongside beam thickness t.
FIG. 1B is a plot of the normalized cell length versus hole distance from the center of the OMC for quadratically varying a(n), $h_x(n)$, and $h_y(n)$ on either side of the beam center. This characterizes the cavity with parameters (a; $a_d$; $h_x$; $h_{x_d}$; $h_y$; $h_{y_d}$; w; t; b)=577.5; 456.75; 200; 341.25; 700; 220.5; 913.5; 250; 60) [nm], where $a_d$ represents the length of the defect cell and $h_{x_d}$ and $h_{y_d}$ represent the ellipse width and height, respectively, for the defect cell.

FIG. 8C illustrates the level structure for the NV of FIG. 1B with a Zeeman shift in an external magnetic field splitting the NV spin $m_s=\pm 1$ sublevels and an electric field splitting the excited state levels $E_x$ and $E_y$ via the DC Stark effect.

FIG. 8D illustrates a Si vacancy (SiV) in diamond in the [111] direction and transition dipoles in the $\hat{\mu}_1=[1\bar{1}0]$ and $\hat{}_2=[\bar{1}\bar{1}2]$ directions.

Figures 1C, 1D, 1E, 1F:
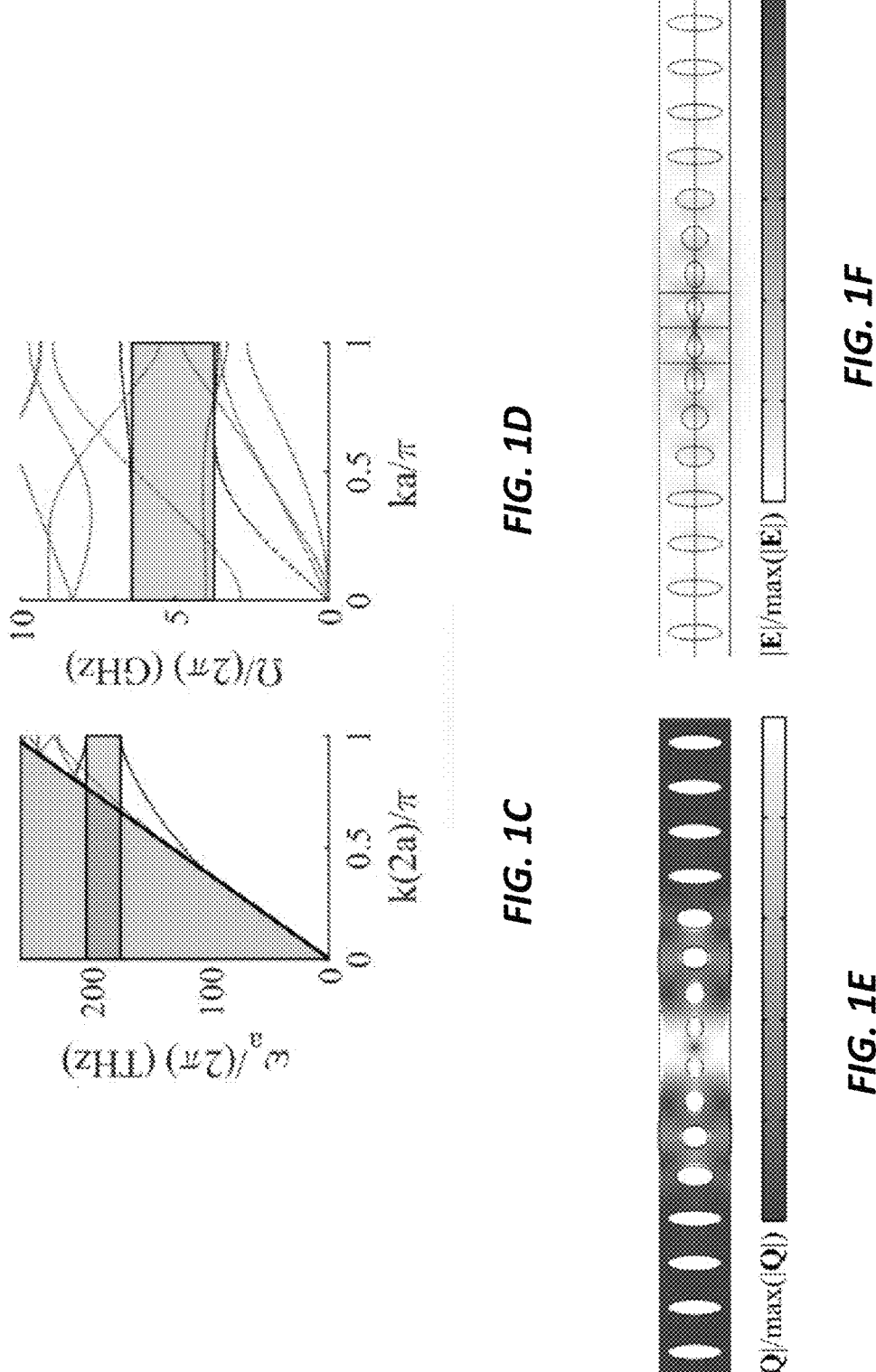
FIG. 1C is a plot of the optical band structure for the mirror unit cell at the center of the OMC in FIG. 1A with a 28.7 THz bandgap near 200 THz.
FIG. 1D is a plot of the mechanical band structure for the mirror unit cell at the center of the OMC in FIG. 1A with a 2.41 GHz mechanical bandgap centered at about 5 GHz.
FIG. 1E illustrates a normalized mechanical displacement profile of the 5.34 GHz mechanical mode of the cavity in FIG. 1A.
FIG. 1F illustrates a normalized electric field profile of the 197.5 THz optical mode of the cavity.

FIG. 8E illustrates the level structure for the SiV of FIG. 1D.

Figures 9A, 9B, 9C:
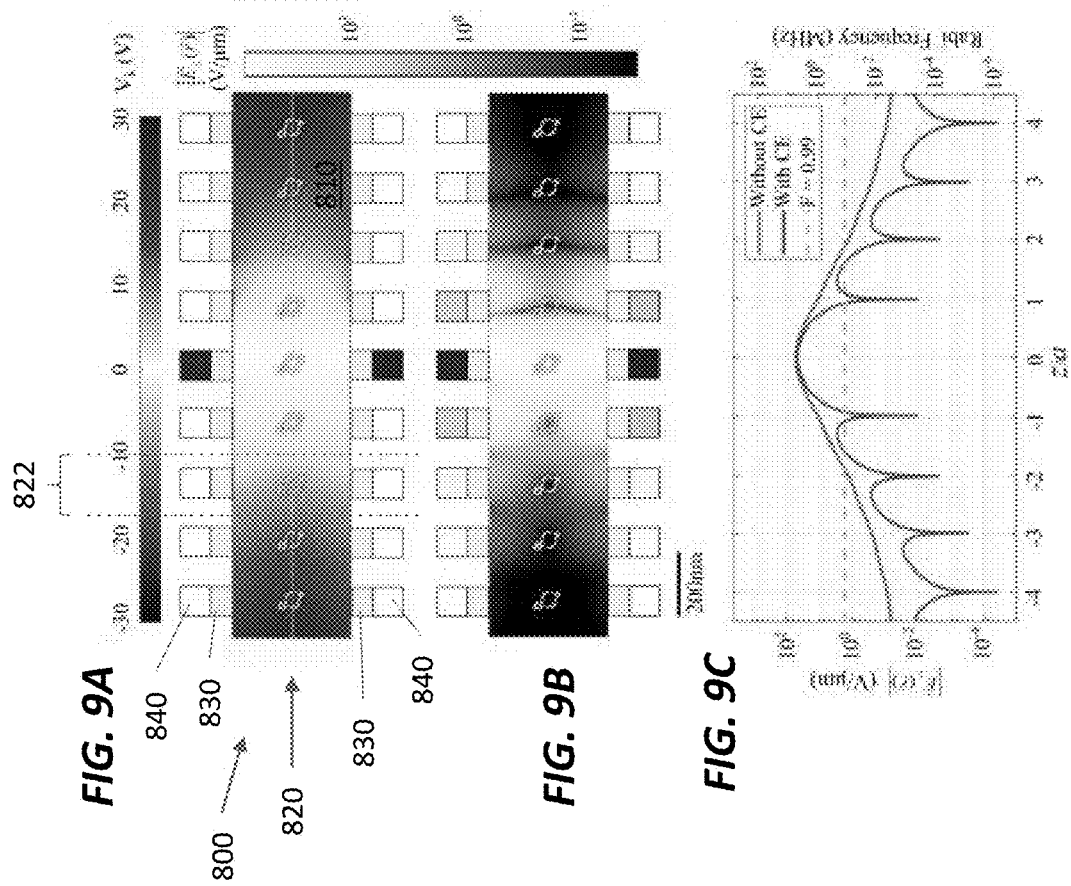

FIG. 9A is a heat map of the electric field component $|\vec{E}_\perp(x=0, y, z)|$ overlaid on an FPSA for an applied voltage on a single pair of electrodes of the FPSA.

FIG. 9B is a heat map of the electric field component $|\vec{E}_\perp(x=0, y, z)|$ overlaid on an FPSA with voltage settings on multiple pairs of electrodes selected for reduced cross-talk.

FIG. 9C is a plot of the electric field component $|\vec{E}_\perp(x=y=0, z)|$ along the central axis of the FPSA (dotted line in FIG. 9A).

Figures 9D, 9E, 9F:
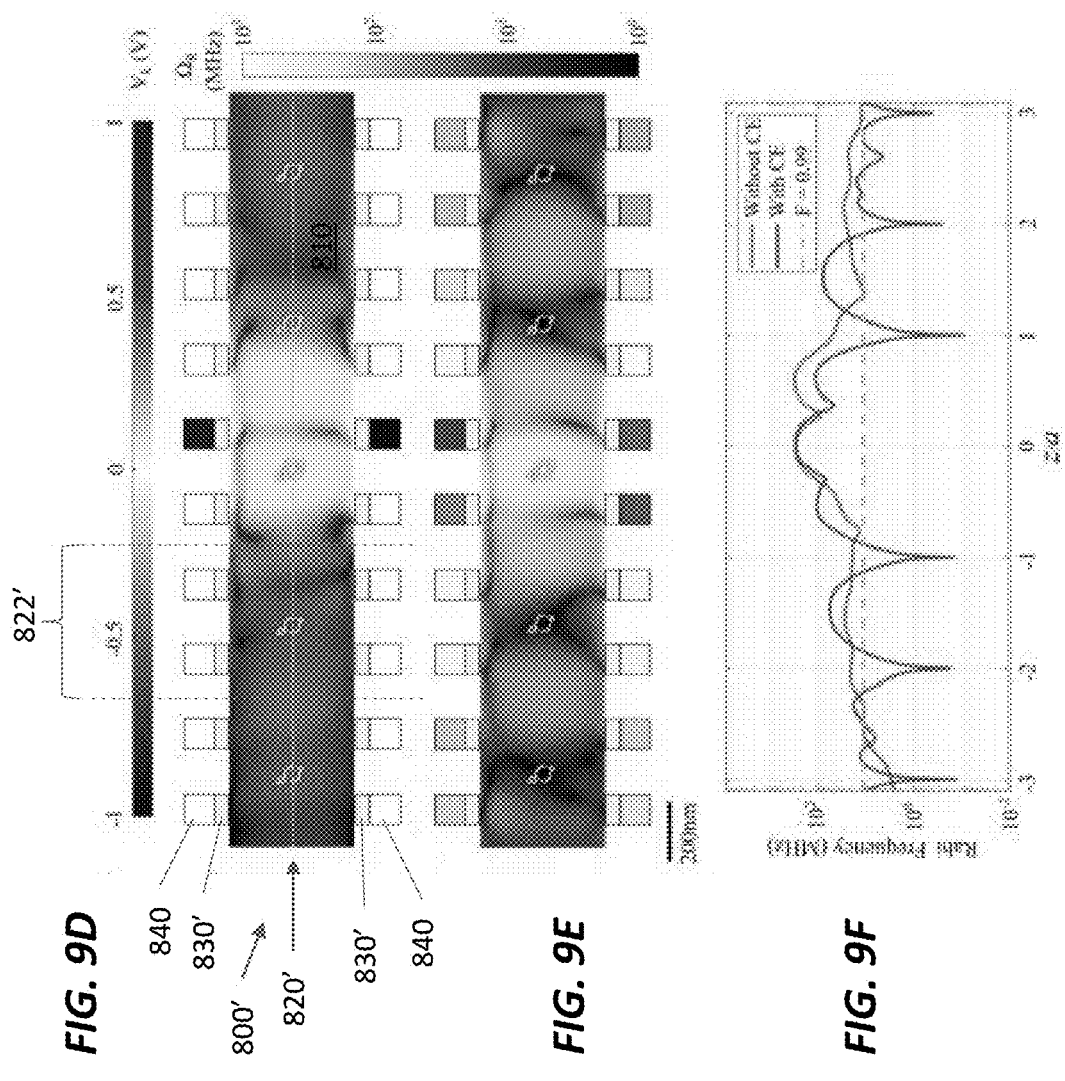

FIG. 9D is a heat map of the Rabi frequency for a single electrode pair in a strain-driven FPSA.

FIG. 9E is a heat map of the Rabi frequency after cross-talk elimination in a strain-driven FPSA.

FIG. 9F is a plot of the Rabi frequency along the dotted line in FIG. 9D.

Figures 10A, 10B:
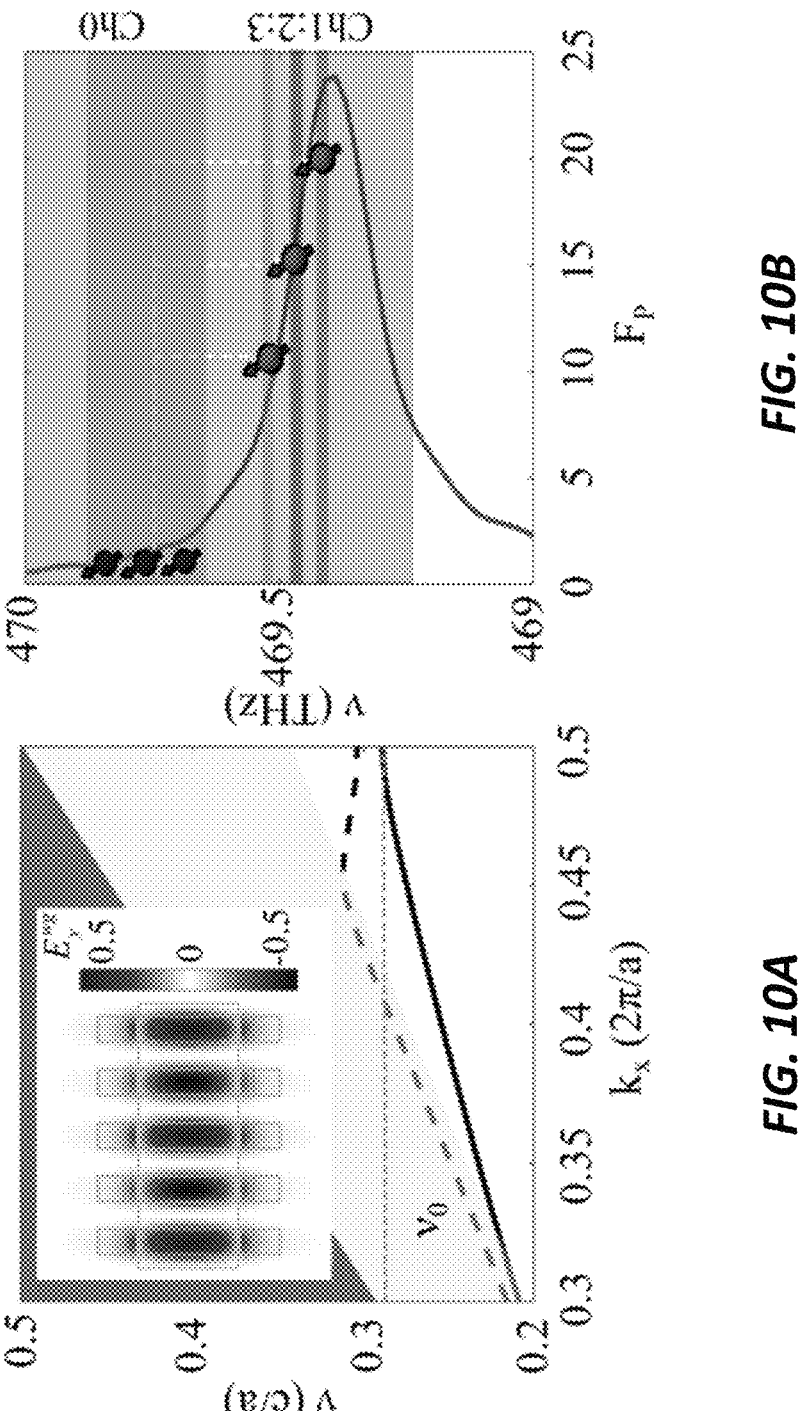

FIG. 10A is a plot of the photonic transverse electric (TE) band structure of the FPSA slow-light waveguide using the parameters shown in TABLE 1. The dark (light) shaded regions indicate the light cone for propagation in free space (substrate). The inset shows the y-component of the electric field at the midplane of the diamond.

FIG. 10B is a plot of the Purcell factor for the FPSA with a finite number of periods n=100 near the bandgap. Shading indicates the Stark tuning range, and the horizontal bands indicates non-interacting frequency channels.

Figures 10C, 10D:
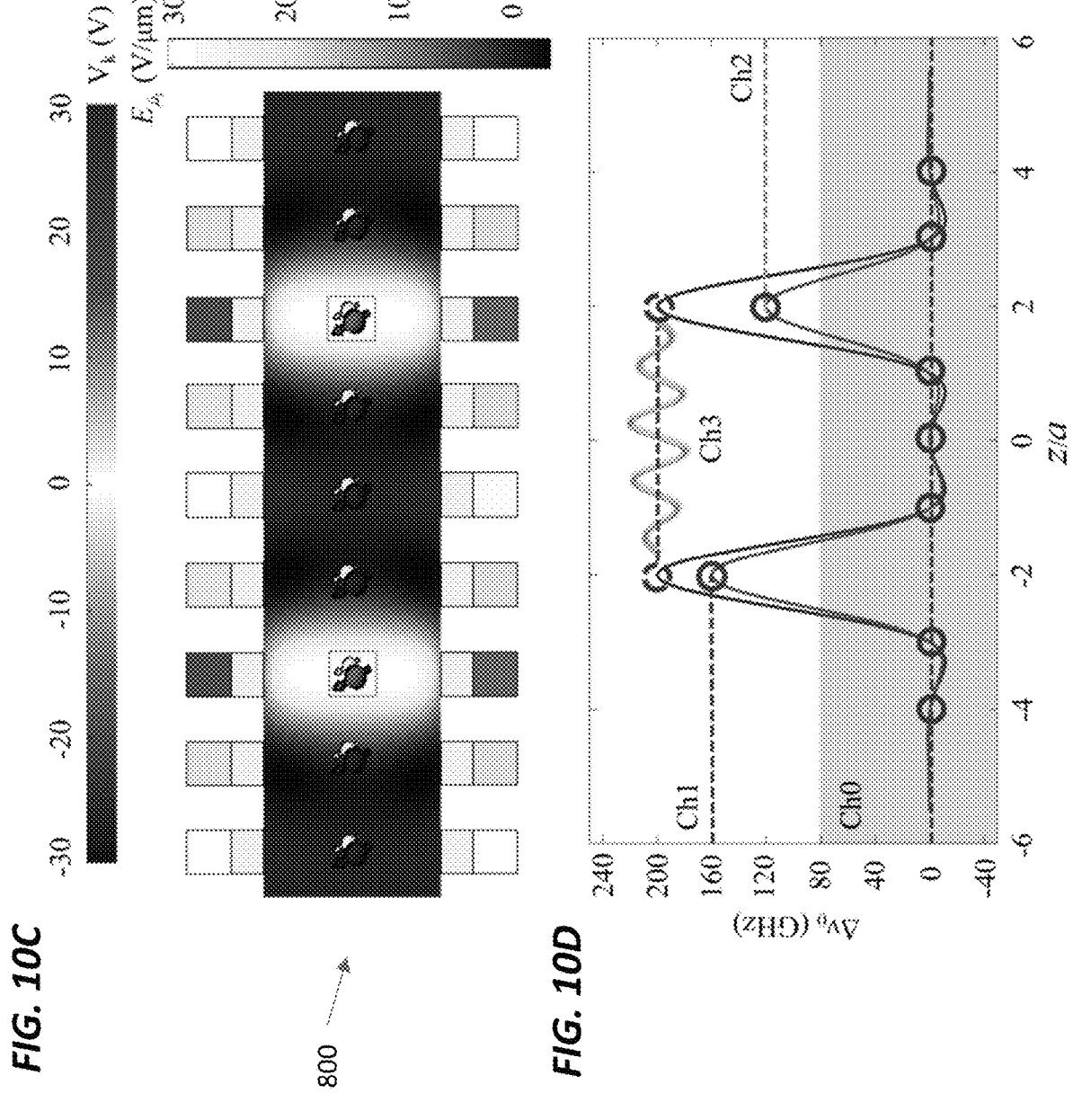

FIG. 10C illustrates the electric field profile for placing two NVs in an FPSA at j=±2 on resonance.

FIG. 10D is a plot of the NV Stark shift versus position for two voltage configurations. One curve shows the Stark shift for the electric field profile shown in FIG. 10C. The other curve shows another voltage setting where two emitters are set in non-interacting channels.

Figures 11A, 11B, 11C, 11D:
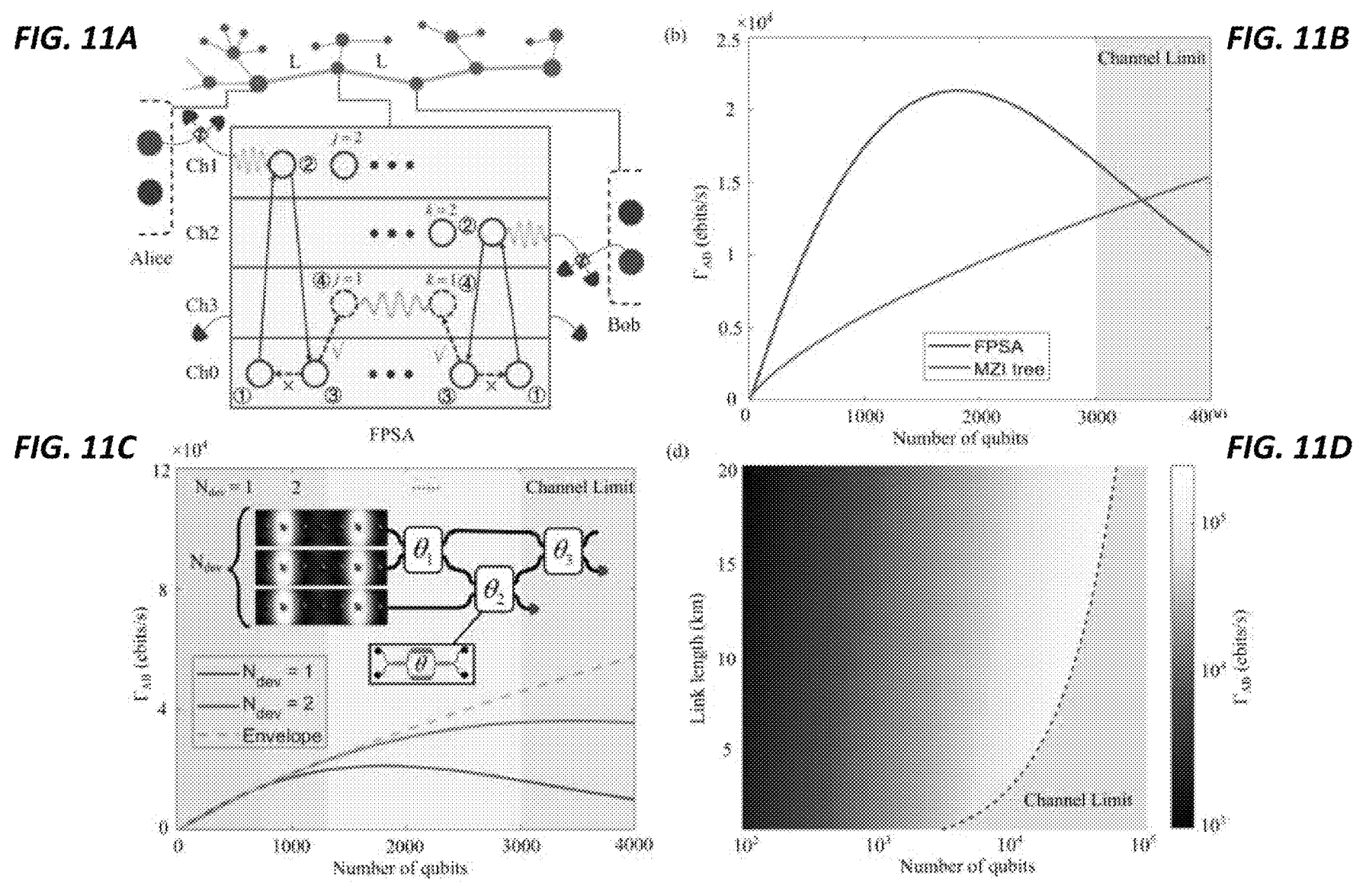

FIG. 11A shows a quantum repeater architecture with three nodes—Alice, Bob and a central FPSA, which includes NVs that are Stark-shifted to four frequency channels (Ch0—Ch3) at different points in the protocol indicated by steps 1-4.

FIG. 11B is a plot of the entanglement rate $\Gamma_{AB}$ over an L=1 km channel as a function of the number of qubits for FPSA (upper trace) and Mach-Zehnder interferometer (MZI) tree (lower trace) architectures. Above 3000 qubits, the entanglement procedure is limited by the channel capacity.

FIG. 11C is a plot of the entanglement rate $\Gamma_{AB}$ as a function of the number of qubits for a hybridization of MZI and FPSA architectures.

FIG. 11D is a plot of the link length versus the number of qubits, with the dotted line indicating the largest entanglement rate $\Gamma_{AB}$ for different link lengths.

Figure 12:
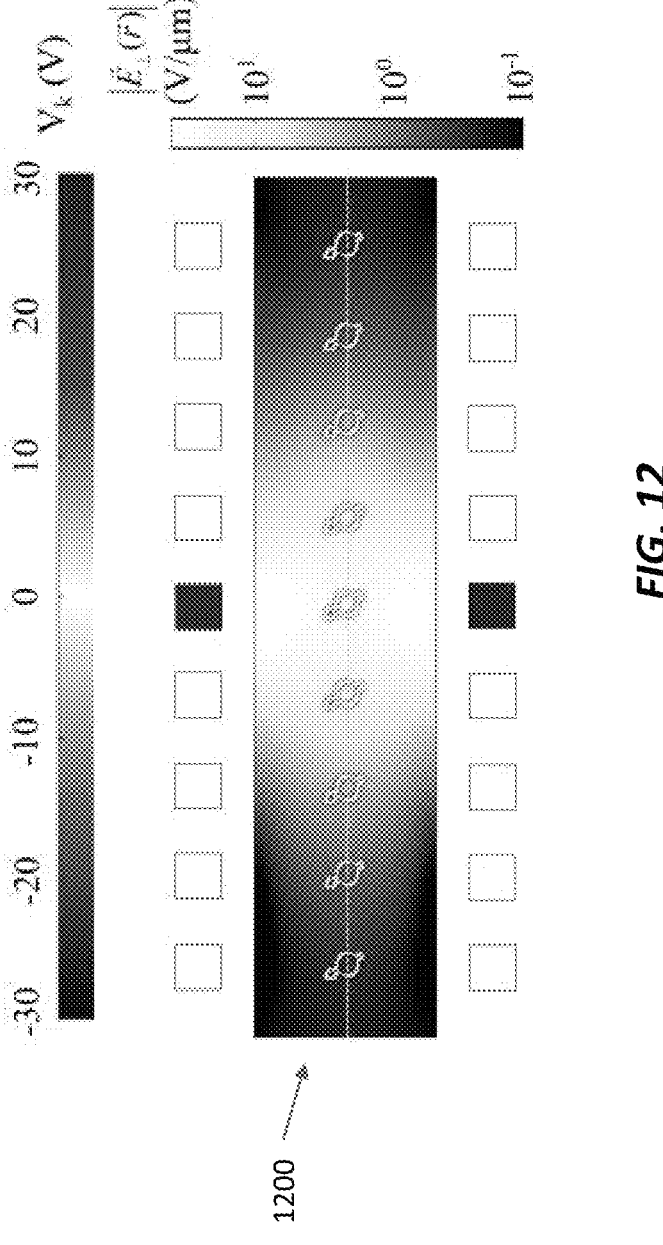

FIG. 12 is a heat map of the electric field profile of an FPSA without dielectric fins.

Figures 13A, 13B:
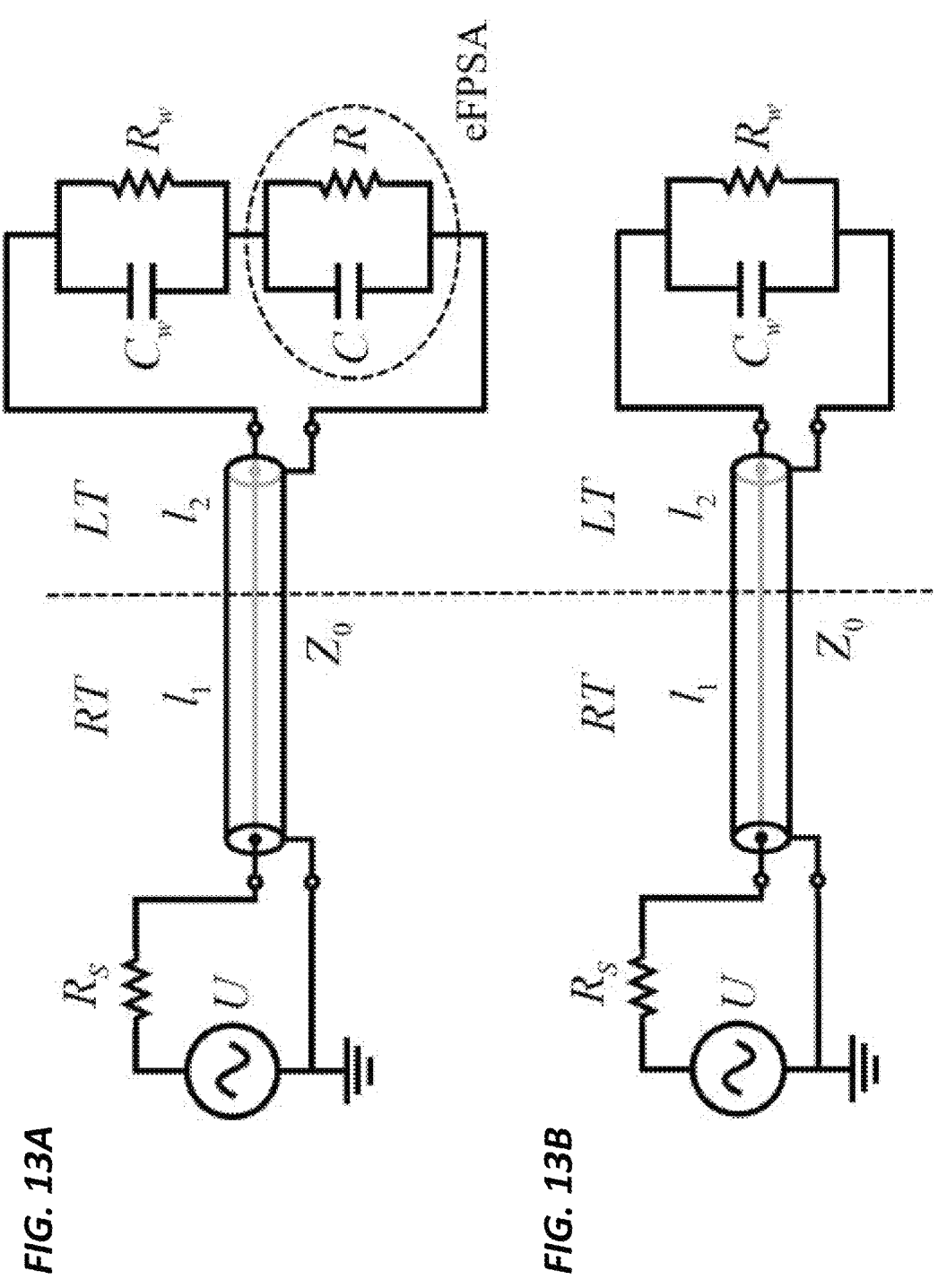

FIG. 13A shows an equivalent circuit for an electric FPSA (eFPSA) with a room temperature (RT) part that contains a transmission line with length $l_1$ and a voltage source U and a low temperature (LT) part that contains a transmission line with length $l_2$ and the eFPSA itself.

FIG. 13B shows an equivalent circuit for an FPSA configured for magnetic field-based control.

Figure 14:
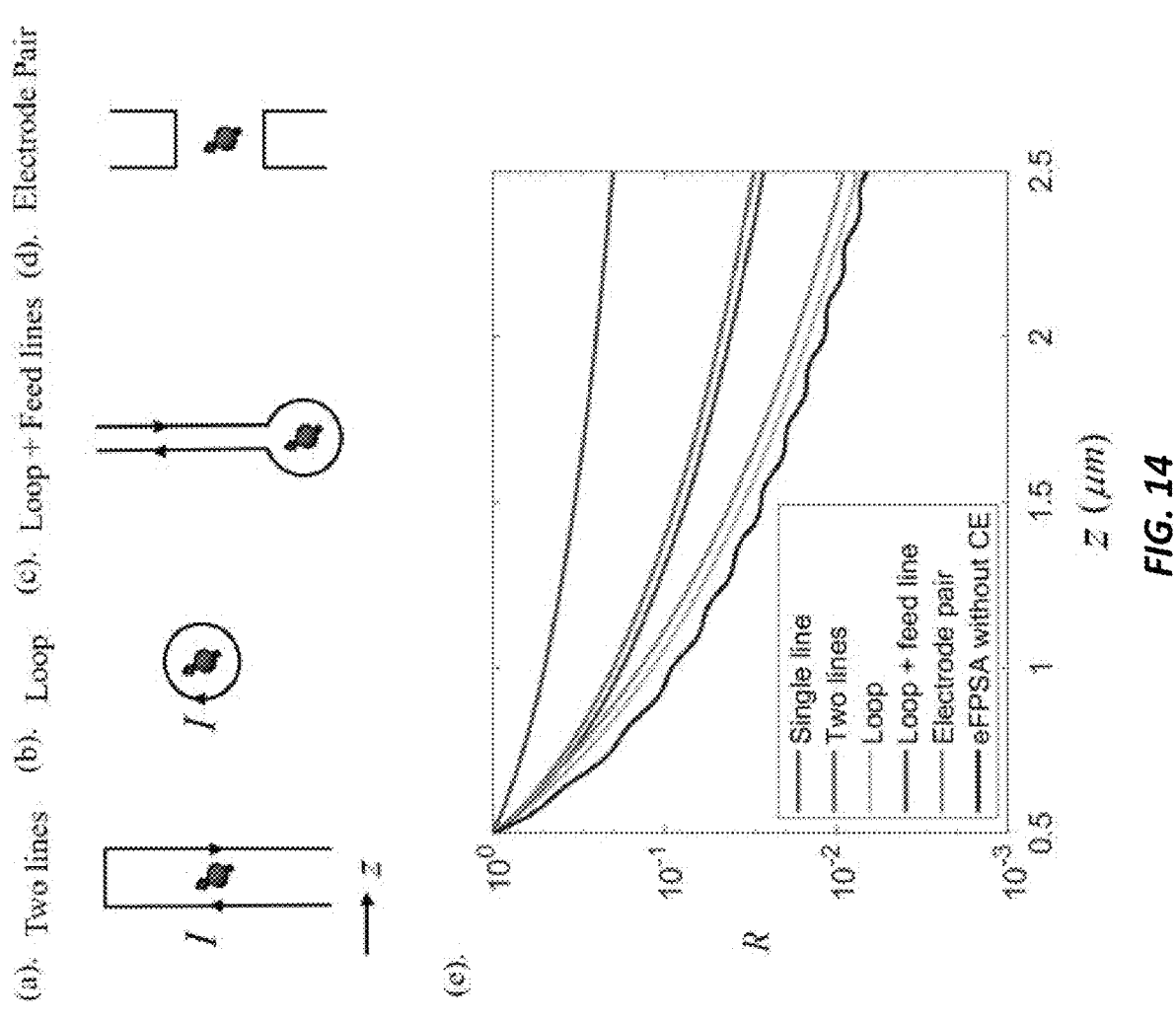

FIG. 14 shows a plot (bottom) comparing field localization for NVs set between two-line, loop, loop and feed line, and electrode pair structures (top).

Figure 15:
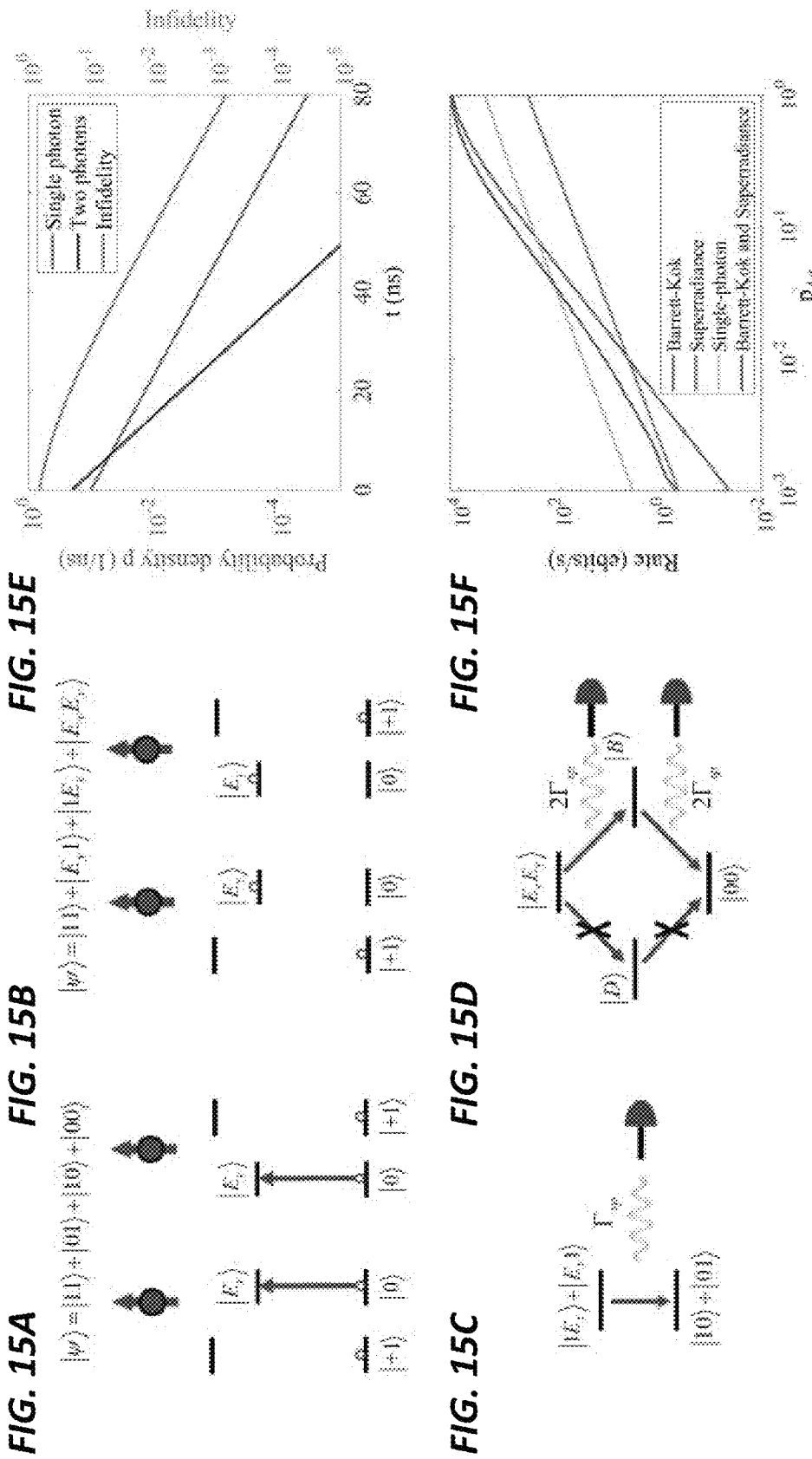

FIG. 15A illustrates two NVs being prepared in state $|\Psi\rangle = |11\rangle + |01\rangle + |10\rangle + |00\rangle$ as part of entanglement generation between the two NVs.

FIG. 15B illustrates the NVs of FIG. 7A being optically excited to $|\Psi\rangle = |11\rangle + |E_y 1\rangle + |1E_y\rangle + |E_y E_y\rangle$.

FIG. 15C illustrates superradiance spontaneous emission from an NV at a rate $2\Gamma_{sp}$ when the NV is at $|E_y E_y\rangle$.

FIG. 15D illustrates single-photon spontaneous emission from an NV at a rate $\Gamma_{sp}$ when the NV is in $|1E_y\rangle + |E_y 1\rangle$.

FIG. 15E is a plot of probability density for single-photon emission (middle trace), double-photon emission (bottom trace), and the infidelity of entanglement generation between a pair of NVs (top trace) versus single-photon detection time.

FIG. 15F is a plot of the entanglement rate versus photodetector detection efficiency for single-photon detection and the Barrett-Kok, superradiance, and combined Barrett-Kok/Superradiance entanglement schemes.

Figure 16:
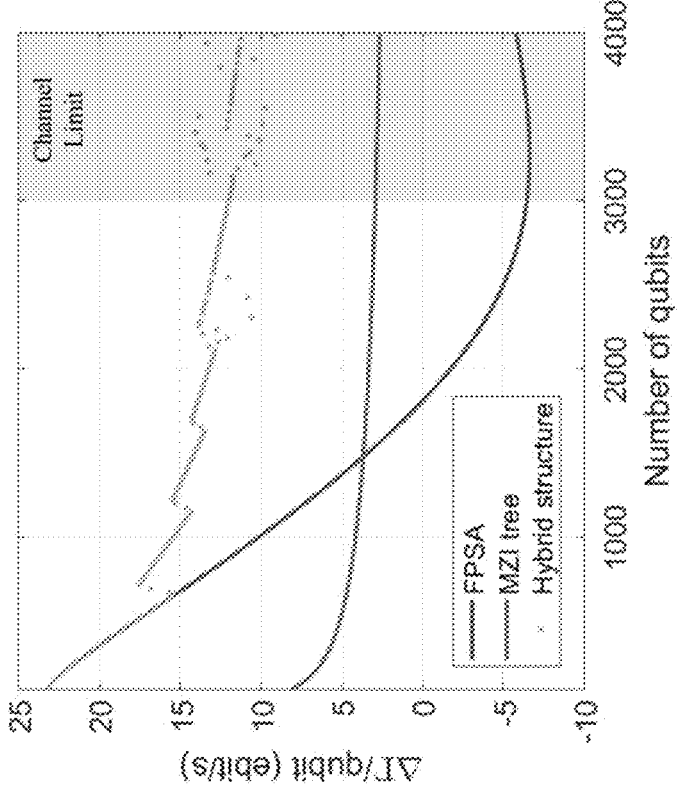

FIG. 16 is a plot of the change in entanglement rate with number of qubits for FPSAs (descending trace), MZI trees (middle trace), and hybrid FPSA/MZI structures (upper, discontinuous trace).

Figure 17B:
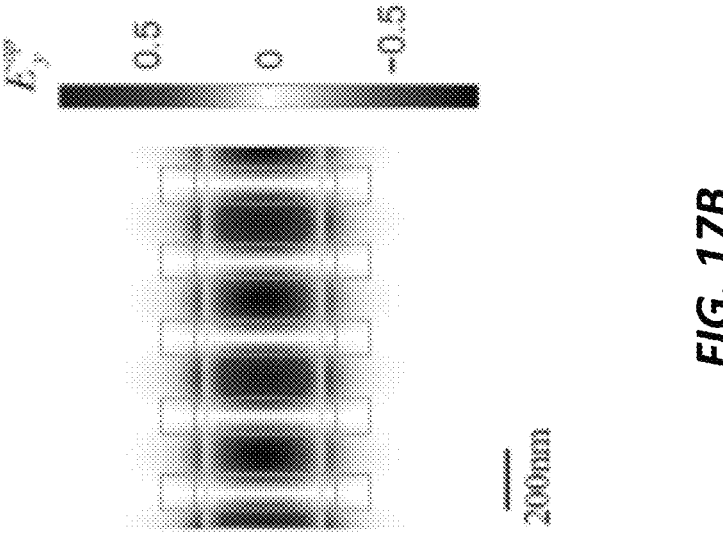
Figure 17A:
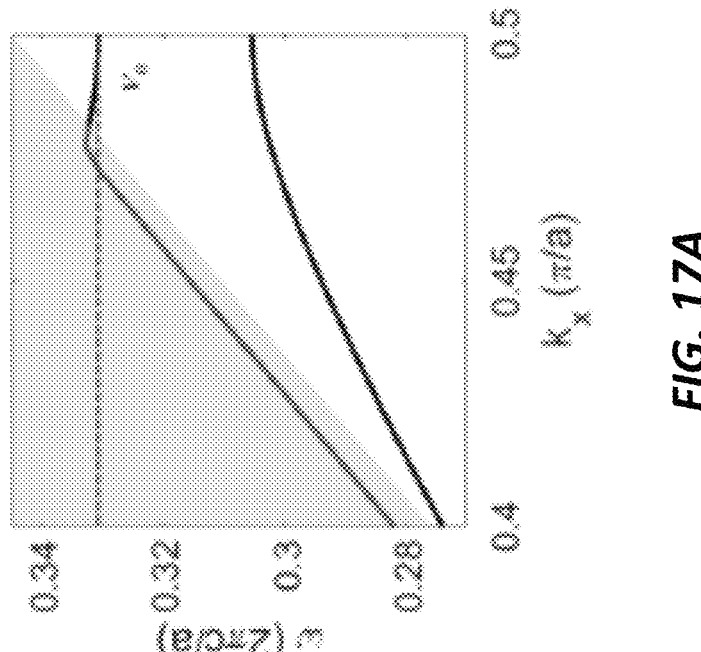

FIG. 17A is a plot of the transverse electric (TE) photonic band structure of an FPSA slow-light waveguide using the parameters in TABLE 1, with shaded regions indicating the light cone for propagation in the substrate.

FIG. 17B is a plot of they component of the electric field at the midplane of the diamond waveguide in the FPSA.

Figures 17C, 17D:
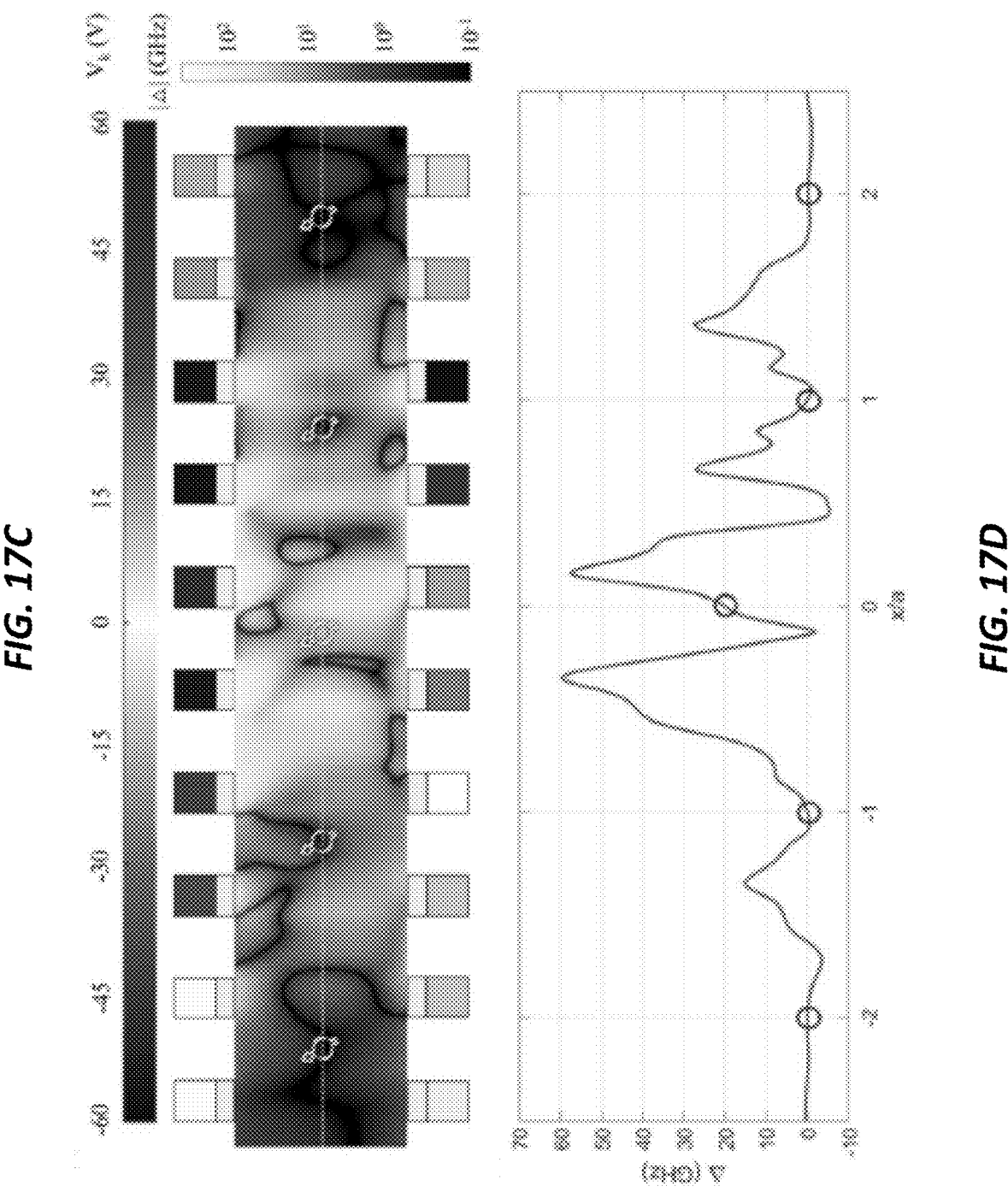

FIG. 17C illustrates optical transition tuning through strain tuning of an FPSA, with a second spin in the FPSA tuned to have a 20 GHz strain tuning and the other spins in the FPSA tuned to have strain tunings of less than 0.3 GHz.

FIG. 17D is a plot of the total strain tuning frequency versus position along the white dotted line in FIG. 17C.

DETAILED DESCRIPTION

A Room-Temperature Coherent Spin-Photon Interface

An ultrasmall mode volume spin-optomechanical interface in a device called a photonic crystal nanobeam or 1D optomechanical crystal (OMC) achieves strong coupling between the mechanical mode of an optomechanical resonator and an embedded spin defect center or color center, such as a Group IV vacancy. The OMC introduces an optical resonance to ultrasmall mechanical cavities for spin-interfacing while also improving the mechanical mode volume figure of merit. An OMC can be used to interact with the spin center defect without optically exciting the spin, while operating at a wavelength defined by the OMC' s optical cavity. This OMC can be used in entanglement protocols in a quantum network.

An OMC brings a self-similar concentrator from photonic crystal devices to a 1D optomechanical crystal for spin-optomechanical interfacing with the resulting cavity. This system offers advantages afforded by highly concentrated optical and mechanical modes: high strain in a central region while retaining optomechanical coupling in diamond relative to other devices, and thus strong spin-phonon interactions. Finite element method (FEM) simulations show that the spin-optomechanical interface provided by an OMC can achieve 200 kHz single photon-phonon coupling alongside 40 MHz spin-phonon coupling to a Group IV spin. This spin-phonon interaction is strong enough to effectively ignore losses incurred when swapping a quantum between a cavity phonon and the spin state.

The spin-optomechanical interface of an OMC can be used in an optically heralded entanglement protocol, among other things. In this scheme, identical cavities are entangled via heralding, and the resulting entangled phonons are swapped into their respective coupled spins. This entanglement procedure completely circumvents standard issues related to spin-addressing, including the need to operate at the emitter's optical transition wavelength (the optical wavelength can be defined with a telecom photonic mode) and concerns related to spectral diffusion of emitters (the emitter is not excited optically). Additionally, this scheme places no strong requirements on the optical quality factors, unlike other approaches to spin-mechanical addressing—instead operating with low optical quality factors to increase the rate of heralding—and can be implemented with on-chip devices that are well within fabricable parameters. As such, this spin-optomechanical interface can be a potent tool in next-generation quantum repeaters.

Spin-Optomechanical Coupling

A spin-optomechanical interface couples the photonic mode of a photonic crystal cavity to the phononic modes of the crystal in a pump-driven interaction. Subsequently, the spin transition of a solid-state color center is coupled to the same phononic modes. The operating frequency of the photonic mode is denoted as $\omega_a$, the spin transition frequency as $\omega_\sigma$, and the pump beam frequency as $\omega_p$. Without loss of generality, assume only a single phononic mode $\Omega$ is nearly resonant with the pump detuning, such that $\Delta = \omega_p - \omega_a \approx \Omega$. The system Hamiltonian can be simplified by considering only a single phononic mode. In this picture, the unperturbed Hamiltonian $\hat{H}_0$ can be written as $$\hat{H}_0 = \hbar\omega_a \hat{a}^\dagger \hat{a} + \hbar\Omega \hat{b}^\dagger \hat{b} + \frac{\hbar\omega_\sigma}{2}\hat{\sigma}_z.$$

Here, $\hat{a}^\dagger$, $\hat{a}$ and $\hat{b}^\dagger$, $\hat{b}$ are the ladder operators of the photonic and phononic modes, respectively, and $\hat{\sigma}_j$ is the spin qubit's j-Pauli operator.

Additionally, the parametric coupling between the mechanical and optical resonators takes the form $\hat{H}_{om} = \hbar g_{om}\hat{a}^\dagger \hat{a}(\hat{b}^\dagger + \hat{b})$, i.e., an optical resonance shift dependent on the position of the mechanical resonator. To linearize this interaction, the optical cavity is driven with a pump $\omega_p = \omega_a + \Delta$. Applying the rotating wave approximation and rewriting the photon ladder operators around a mean population $\alpha$ as $\hat{a} \to \alpha + \hat{a}$ yields the typical optomechanical interaction Hamiltonian in the blue-detuned regime, $$\hat{H}_{om} = \hbar g_{om}\alpha\left(\hat{a}^\dagger \hat{b}^\dagger + \hat{a}\hat{b}\right).$$

Next, consider the spin-mechanical interaction. In a spin-strain interaction picture, this is generated by deformation-induced strain causing a level shift in the spin qubit transition energy. This level shift is described by the spin-mechanical interaction Hamiltonian $$\hat{H}_{sm} = \hbar g_{sm}\left(\hat{\sigma}_+ \hat{b} + \hat{\sigma}_- \hat{b}^\dagger\right).$$

Here, $g_{sm}$ is the strain-induced coupling by the zero-point fluctuation of the mechanical resonator and $$\hat{\tau}_\pm = \frac{1}{\sqrt{2}}(\sigma_x \pm i\sigma_y).$$

As such, any phonon excitation induce zero-point coupling between the spin qubit and resonator phonon and vice versa. Then the full system Hamiltonian is $$\hat{H} = \hat{H}_0 + \hat{H}_{om} + \hat{H}_{sm}.$$

To devise an efficient spin-optomechanical interface, the strain-induced coupling $g_{sm}$ and mechanical quality factor $Q_{mech}$ should be increased or maximized while maintaining high $g_{om}$ as in the OMC disclosed herein.

Optomechanical Crystal (OMC) Design and Simulations

FIG. 1A shows a strain concentrator embedded in a one-dimensional optomechanical crystal (1D OMC) 100. The 1D OMC 100 includes a nanobeam 110 that has a width w and a thickness t and can be made of diamond or another suitable solid-state host for spin center defects. The nanobeam 110 is divided into unit cells 120, each of which has a width or period a(n) and features an elliptical hole or cavity 122 with minor and major axes $h_x(n)$ and $h_y(n)$, respectively, where n is the unit cell number or index. The elliptical holes 122 morph adiabatically with cell number n closer to the middle of the nanobeam 110. The unit cell period may vary from about 400-600 nm (e.g., 425, 450, 475, 500, 525, 550, or 575 nm) as a function of distance from the center of the nanobeam 110. Similarly, the major and minor axes of the hole may vary from 200-400 nm (e.g., 225, 250, 275, 300, 325, 350, or 375 nm) and from 200-700 nm (e.g., 250, 300, 350, 400, 450, 500, 550, 600, or 650 nm), respectively, as a function of distance from the center of the nanobeam 110. The major and minor axes get smaller and larger, respectively, closer to the center of the nanobeam 110, which may be about 800-1000 nm wide (e.g., 825, 850, 875, 900, 925, 950, or 975 nm) and 200-300 nm thick (e.g., 225, 250, or 275 nm).

The central unit cells 120' are mirror unit cells 120' that concentrate optical and mechanical fields. The major axes of the elliptical holes 122' in the central unit cells 120' are tapered as a function of unit cell number n using a hyperbolic curve as shown in FIG. 1B, which also shows that the cell period a(n) decreases and the minor axes increase closer to the center of the nanobeam 110 (n=0). The holes 122' in the middle pair of unit cells 120' are separated by a bridge 124 whose width b can be selected based on the desired optomechanical properties of the OMC 100, e.g., from 50-100 nm.

The OMC 100 also includes one or more color centers 130 (e.g., Group IV vacancies) formed in the nanobeam 110. The OMC 100 can be made by implanting the color centers 130 randomly throughout a diamond or carbide substrate, detecting the good color centers 130 and etching the nanobeam 110 around the good color centers 130 from the substrate. The unit cells 120 and holes 122 are oriented such that the good color centers 130 are positioned in regions where the strain-induced coupling is expected to be highest (e.g., the shaded regions shown in FIGS. 2A and 4, both described below). As shown in FIG. 1A, these regions tend to be at opposite ends of the holes 122' in the central unit cells 120' along the central axis of the nanobeam 110, in the bridge 124 and on the far side of the bridge 124.

FIGS. 1C-1F show the results of COMSOL FEM simulations of the OMC 100 in FIG. 1A. FIGS. 1C and 1E show that the OMC 100 has an optical mode of frequency $\omega_a/(2\pi) \approx 197.5$ THz and optical quality factor $Q_{opt} \approx 3.6 \times 10^4$, which lies in the mirror cells' 28.7 THz optical bandgap from 175.28 THz to 203.98 THz. Per FIGS. 1D and 1F, the OMC 100 has an acoustic resonance around $\Omega = 5.34$ GHz between the 2.41 GHz acoustic bandgap from 4.96 GHz to 7.37 GHz.

In optomechanical crystals, single photon-to-single phonon coupling between a photonic cavity mode and a mechanical resonant mode arises due to the cavity frequency shift induced by the acoustic displacement profile, normalized to the zero-point fluctuation $x_{zpf}$:

$$g_{om} = \frac{\partial\omega}{\partial q}x_{zpf}.$$

The cavity zero-point fluctuation can be approximated using the resonator's effective mass $m_{eff}$ as $$x_{zpf} = \sqrt{\frac{\hbar}{2m_{eff}\Omega}},$$

-continued $$m_{eff} = \frac{\int_V dr Q^*(r)\rho(r)Q(r)}{\max(|Q(r)|^2)},$$

where $\hbar$ is Planck's constant. Here, $Q(r)$ is the mechanical displacement profile and $\rho(r)$ is the density profile (either $\rho_{diamond}$ or 0).

This includes two effects: the moving boundary effect (shift due to moving vacuum-dielectric boundary conditions resulting from mechanical displacement) and the photoelastic effect (frequency shift due to the sum of strain-induced local refractive index changes in the crystal). The vacuum moving boundary coupling $g_{MB}$ can be written as $$\frac{g_{mb}}{x_{zpf}} = -\frac{\omega_a}{2} \frac{\int_S (Q(r) \cdot n)(\Delta\varepsilon|e^{\parallel}|^2 - \Delta(\varepsilon^{-1})|\vec{d}^{\perp}|^2)dA}{\max(|Q(r)|)\int \varepsilon(r)|e(r)|^2 d^3r}$$

The photoelastic coupling $g_{pe}$ can be expressed as $$\frac{g_{pe}}{x_{zpf}} = -\frac{\omega_a}{2} \frac{\int_V e \cdot \delta\varepsilon \cdot e d^3r}{\max(|Q|)\int_V \varepsilon(r)|e(r)|^2 d^3r}$$

Here, $e(r)$ is the cavity electric field profile. Expanding the integrand in the numerator of the preceding equation under the assumption that diamond is mechanically isotropic gives:

$$\varepsilon \cdot \delta\varepsilon \cdot e = e \cdot \left(\varepsilon^2 \frac{pS}{\varepsilon_0}\right) \cdot \vec{e}$$

$$= e \cdot \left(\varepsilon_0 n^4 p_{ijkl}(\alpha)S_{kl}\right) \cdot e.$$

Here, $p_{ijkl}$ is a function of the diamond crystallographic orientation relative to the device geometry, which runs along $\hat{x}$ in the xy-plane, and $\varepsilon_0$ is the vacuum permittivity. Parametrized by $\alpha$, the rotated $p_{ijkl}$ is given by $$p_{ijkl}(\alpha) = R(0, \alpha)_{iq} R(0, \alpha)_{jr} R(0, \alpha)_{ks} R(0, \alpha)_{lt} p_{qrst},$$

where $$R = \begin{bmatrix} \cos\phi & \sin\phi & 0 \\ -\cos\theta\sin\phi & \cos\theta\cos\phi & -\sin\theta \\ -\sin\theta\sin\phi & \sin\theta\cos\phi & \cos\phi \end{bmatrix}.$$

Figures 2A, 2B, 2C:
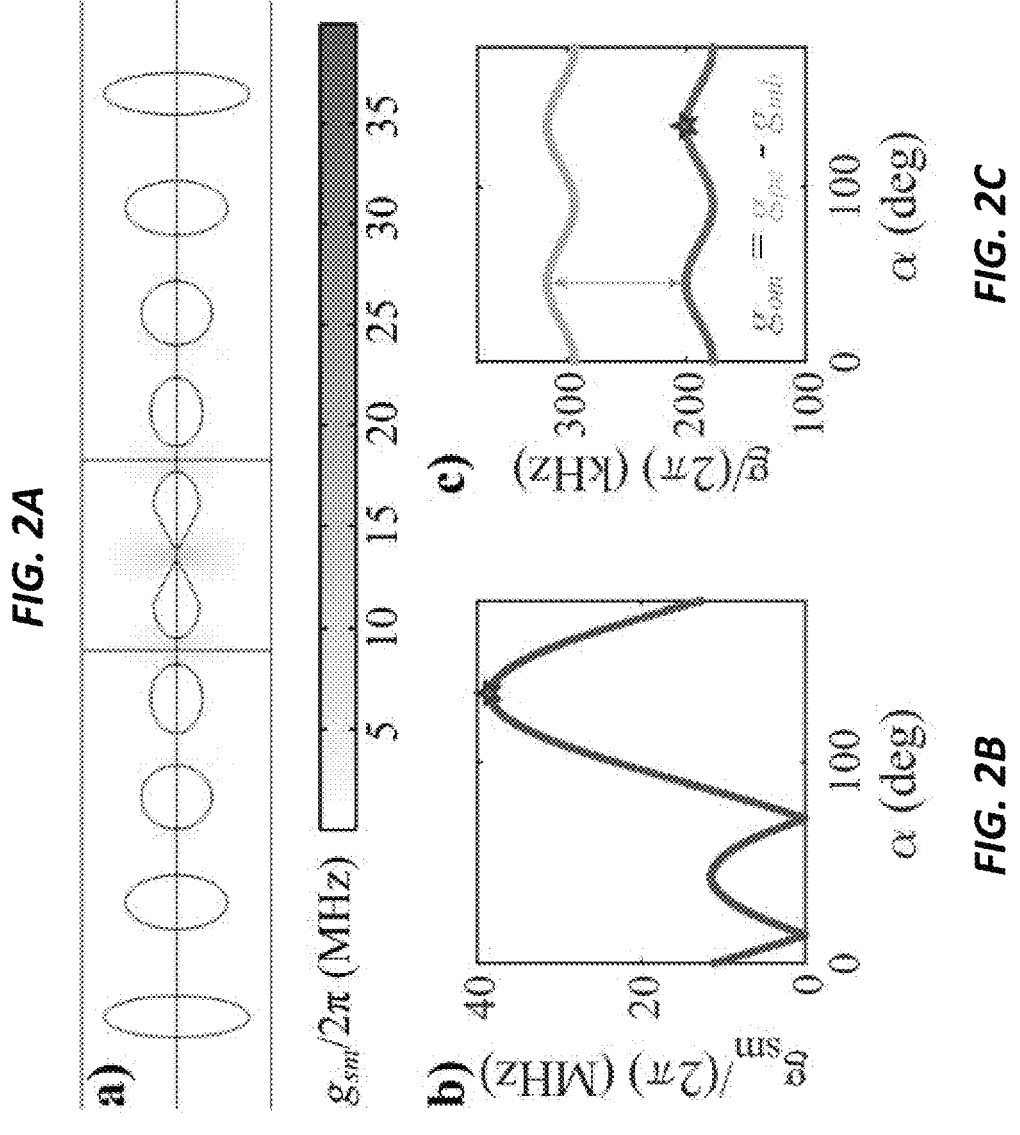
FIG. 2A is an xy slice of the spin-mechanical coupling profile in a nanobeam photonic crystal.
FIG. 2B is a plot of the strain-induced coupling rate $g_{sm}$ as a function of Euler angle $\alpha$ where the preferred crystal orientation is starred.
FIG. 2C is a plot of the vacuum coupling rate $g_{om}$ as a function of Euler angle $\alpha$ where the preferred crystal orientation is starred.

The simulations presented above used $(p_{11}, p_{12}, p_{44})=(-0.25, 0.043, -0.172)$. As shown in FIG. 2C, the anisotropic nature of the photoelastic tensor yields a variation in $g_{PE}$ of about 7% with $\alpha$, maxing out at $g_{pe}/(2\pi)=316$ kHz for $\alpha=\pi/4,3\pi/4$ rad. Summing with $g_{mb}/(2\pi)\approx-116$ kHz gives a total vacuum coupling rate $g_{om}/(2\pi)=200$ kHz.

The ultimate spin-phonon coupling is a function of the strain-induced $g_{sm}$ profile shown in FIG. 2A. In FIG. 2A, $g_{sm}$ represents the effective spin-orbital coupling resulting from a change in the spin defect center (here, SiV$^-$) transition frequency as a function of displacement-induced strain, $$g_{sm}(r) = d \frac{(\epsilon_{xx}(R) - \epsilon_{yy}(r))}{\max(|Q|)} x_{zpf}$$

Here, $d\approx1$ PHz/strain is the strain-susceptibility parameter describing the mixing of SiV$^-$ orbitals, and $\epsilon_{xx}$ and $\epsilon_{yy}$ describe the strain tensor components of the SiV$^-$. The SiV$^-$ {x, y, z}-axis is offset from the diamond {$x_0$, $y_0$, $z_0$} axis by a polar angle $\theta=\arcsin\sqrt{2/3}$ rad and an azimuthal angle $\phi=\pi/4$ rad. To get $\epsilon_{xx}$ and $\epsilon_{yy}$ of the SiV$^-$ from crystal tensor components, apply the rotation operation $$\epsilon_{ijkl} = R(\theta, \phi)_{iq} R(\theta, \phi)_{jr} R(\theta, \phi)_{ks} R(\theta, \phi)_{lt} \epsilon_{0qrst}(\alpha).$$

Generally, the color centers should be situated at near the locations where the strain-induced coupling rate is high, e.g., the shaded portions in FIG. 2A.

FIG. 2B is a plot of the location of maximum $g_{sm}$ in the cavity for each mechanical mode. It shows that the spin-orbital coupling $g_{sm}$ varies by location in the cavity and is maximized at an angle $\alpha=3\pi/4$ rad, with a maximum value $g_{sm}/(2\pi)\approx41$ MHz, owing to phase matching between $\epsilon_{0_{yy}}$ and $(\epsilon_{0_{xy}}+\epsilon_{0_{yx}})$ terms.

FIGS. 3A-3F illustrate the impact of changing the bridge width, b: as b decreases, the optical and acoustic mode profiles become more strongly influenced by the concentrator, whereas for larger b the modes are spread across the neighboring defect cells. Mechanically, a smaller b (FIG. 3A, left) can be interpreted as a weakening spring constant in the central bridge between the masses of the walls surrounding the bridge. Hence, as b decreases, $\Omega$ decreases and $x_{zpf}$ increases as shown in FIGS. 3B and 3C. FIG. 3D shows that the strain in the central cavity increases, boosting $g_{sm}$, for a decreasing "spring constant" and increasing $x_{zpf}$.

Another interpretation of the increase in $g_{sm}$ with decreasing b is that of mechanical mode volume: as b decreases, the strain energy density of the mechanical mode becomes more highly concentrated in the taper, thereby decreasing the mechanical mode volume $V_{mech}$ dramatically. FIG. 3D shows that $$V_{mech}/\Lambda_p^3$$

(lower data points) and $$V_{mech}/\Lambda_s^3$$

(upper data points) drop from $\sim10^{-4}$ and $\sim10^{-3}$, respectively, to $\sim10^{-6}$ and $\sim10^{-5}$, respectively, as b decreases from 100 nm to 20 nm. Here, $\Lambda_p$ and $\Lambda_s$ are the longitudinal and shear wave velocities in bulk diamond. As $V_{mech}$ decreases, the "mechanical Purcell factor" of the cavity increases, causing $g_{sm}$ to rise. Similarly, FIG. 3E shows that $V_{opt}/\lambda^3$ (lower data points) and $V_{opt}/(\lambda/n)^3$ (upper data points) decrease from $\sim10^{-2}$ and $\sim10^{-1}$, respectively, to $\sim10^{-4}$ and $\sim10^{-3}$, respectively, with decreasing b—a beneficial effect for simultaneously concentrating the cavity mechanical and optical modes. Here, $\lambda$ is the free space cavity wavelength, and n is the refractive index of diamond.

With decreasing optical mode volume, the cavity optical energy density should be more confined in the concentrator for decreasing b, which leads to two potentially competing effects. The first is that any photoelastic- or moving boundary-based contributions to $g_{om}$ within the concentrator will be magnified; the second is that the effective volume of dielectric over which these magnified effects manifest decreases. FIG. 3G shows that, based on these competing effects, a bridge width of b=60 nm optimizes $g_{om}$ for the OMC in FIG. 1A. FIG. 3F shows that making b as small as possible increases $g_{sm}$. That said, setting a lower bound of b=60 nm eases fabrication. Placing the emitters as close to the edge of the taper as possible should increase or maximize $g_{sm}$. This proximity to dielectric walls normally imposes a limitation on the optical coherence of an emitter, but because the OMC interacts with the emitter non-optically, it circumvents this obstacle.

FIG. 4 illustrates the idea that the coupling mode of interest is sufficiently spaced from other mechanical modes in frequency. The left column shows plots of the profiles of modes of $g_{sm}$>10 MHz within 2 GHz of $\Omega$=5.34 GHz. The "high $g_{sm}$" modes are at least 400 MHz apart from the mode of interest and feature at most half as high max($g_{sm}$) over the mode profile. Parasitic spin-mechanical coupling to these modes can be modeled as a loss channel of the primary mechanical mode alongside the intrinsic mechanical loss κ, with loss to mode i given by $$\kappa_i \approx g_{sm_i}\left(\frac{g_{sm_i}^2}{g_{sm_i}^2 + \Delta_i^2}\right)^2$$

From the closest mode at 4.91 GHz, which has a similar profile to the mode of interest, $\max_i\{\kappa_i(2\pi)\}\approx$50 kHz. This corresponds to an effective quality factor $Q_i\approx3\times10^6$. FEM simulations show that mechanical quality factors are higher than this parasitic coupling-induced Q, indicating that external resonances can limit the cavity phonon lifetime when the quantum emitter (spin defect center) is implanted precisely in the concentrated coupling region of the parasitic mode, which from FIG. 4 is visually more compact than the mode of interest. If the spin defect centers are implanted at a distance from the dielectric boundary, then these parasitic loss channels become weaker.

Another limiting loss channel is thermal loss, which can be characterized as phonon-phonon interactions using the Akhiezer or Landau-Rumer loss models. At higher temperatures, these thermal losses may dominate due to the greater presence of thermal phonons in the cavity. At lower temperatures, other losses—including clamping losses, parasitic coupling, and material losses—may dominate.

Remote Entangling Protocols

The controlled opto-mechanical two-mode squeezing represented by $\hat{H}_{om}$ enables the OMC to herald the creation of single phonons in the mechanical resonator. Such excitations can then be deterministically transferred to the spin for long term storage. For example, when employing the Duan, Lukin, Cirac, and Zoller (DLCZ) entangling protocol, coupled OMCs can herald an entangled $|01\rangle \pm |10\rangle$ state in two remote mechanical resonators. Each of the two mechanical resonators can then deterministically swap its content with the corresponding OMC's embedded spins, leading to two remote entangled long-lived spins for use in quantum networking.

FIG. 5 shows an entangling setup between nodes 600a-600c (collectively, nodes 600), each of which contains an OMC. Each OMC is modeled as an optical resonator 602 (cavity, right) coupled to a mechanical resonator 604

(spring, left), with an embedded spin defect center 606. The setup also includes a pump laser 620 optically coupled to the nodes 600 via waveguides 622, such as optical fibers, and/or other components, such as splitters, couplers, and so on. Another waveguide 636 (e.g., another optical fiber) couples the nodes 600 to four-port beam splitters 630a and 630b (collectively, beam splitters 630). In FIG. 5, nodes 600a and 600b are coupled to the input ports of beam splitter 630a, and nodes 600b and 600c are coupled to the input ports of beam splitter 630b. The output ports of the beam splitters 630 are coupled to respective photodetectors—in FIG. 5, photodetectors 632a and 634a are coupled to the output ports of beam splitter 630a, and photodetectors 632b and 634b are coupled to the output ports of beam splitter 630b.

The entangling setup in FIG. 5 can carry out the DLCZ protocol. The DLCZ protocol is, at its core, two single-phonon heralding experiments running in parallel. A pump beam 621 from the pump laser 620 induces a two-mode squeezing in the OMC in a node 600. The leakage of an optical photon 631 from the OMC into the output waveguide 636 and its detection by one of the photodetectors 632, 634 herald the creation of a single mechanical phonon. The beam splitter 630 before the photodetector 632, 634 can be used to "erase" the knowledge of the original source of the photon, leading to the heralding of an entangled state $|10\rangle + |01\rangle$ between the mechanical resonators 604 of two neighboring nodes 600. In other words, when a phonon is heralded by the detection of a photon, the phonon is in equal superposition of being in the left or in the right node. The phase depends on which of the two photodetectors 632, 634 clicked, i.e., which photodetector detected the photon.

The fidelity and success probability of the single-phonon heralding protocol directly affects the performance of the overall entanglement protocol. In this process, the kets follow the Fock basis with the optical and mechanical modes written down in that order, e.g., $|01\rangle$ is zero photons and one phonon. Two processes are involved in the single-phonon heralding: (1) two-mode squeezing that leads to the mapping $|00\rangle \rightarrow |00\rangle + \varepsilon|11\rangle + \mathcal{O}(\varepsilon^2)$; and (2) leakage into a waveguide and subsequent detection of the photon, which projects on the $\varepsilon|11\rangle + \mathcal{O}(\varepsilon^2)$ branches. The dynamics can be derived using a stochastic master equation and tracking the most-probable quantum trajectories manually. The dynamics are governed by the equation $$\hat{H}_{stoch} = \hat{H}_0 + \hat{H}_{om} + \hat{H}_{sm} - \frac{i}{2}\sum_{c\in\{a,b,b^\dagger\}} \gamma_c\, \hat{c}^\dagger\hat{c},$$

where the sum over jump operators $\hat{c}$ provides a way to track the chance for discontinuous jumps. If $|\psi(t)\rangle$ is the state obtained after evolving $|00\rangle$ under $\hat{H}_{stoch}$, then the probability density for a jump $\hat{c}$ is $pdf_c(t)=\gamma_c\langle\psi(t)|\hat{c}^\dagger\hat{c}|\psi(t)\rangle /\langle\psi(t)|\psi(t)\rangle$. The operator $\hat{a}$ represents the chance of photon leakage at rate $\gamma_a=\omega_a/Q_{opt}$ with $Q_{opt}$ the optical quality factor; $\hat{b}$ corresponds to a phonon leaking to the heat bath at rate $\gamma_b=\gamma_m(n_{th}+1)/2$, where $\gamma_m=2\Omega/Q_{mech}$ and $Q_{mech}$ is the quality factor of the mechanical resonator (the different convention leads to a factor of 2 difference); lastly, $\hat{b}^\dagger$ corresponds to receiving a phonon from the bath at rate $\gamma_{b^\dagger}=\gamma_m n_{th}/2$, where $n_{th}=k_b\tau/\Omega$ is the average number of phonons in the bath, $k_b$ is the Boltzman constant, and $\tau$ is the temperature of the bath. Solving for the dynamics and the probability densities of various jumps leads to:

1. To zeroth order, no jump occurs.
2. To first order, a photon-phonon pair is heralded. The probability of that event is $P_a=$ $$\int_0^T dt\, pdf_a(t).$$

3. To second order, a photon-phonon pair is heralded and then followed by any other event, for an overall of probability $P_{a*}=1-\langle\psi(T)|\psi(T)\rangle$ .
4. Also to second order, a b event at time $\tau$ is followed by an a event, happening with $$P_{ba} = \int_0^T d\tau\, pdf_b(\tau) \int_\tau^T dt\, pdf_{ba}(t).$$

5. Similarly, for $b^\dagger$ followed by a we have probability $P_{b^\dagger a}$.

Above, T is the duration of the pump pulse. These are the branches of the dynamics that have a chance of triggering a heralding event (to leading order). The total chance for heralding is $P=P_a+P_{ba}+P_{b^\dagger a}$, while the fidelity of the heralded single phonon is $F=(P_a-P_{a*})f_0/(P_a+P_{ba}+P_{b^\dagger a})$, where $f_0=\langle 1|\rho_a|1'$ is the fidelity of the "good heralding" branch of the dynamics. $\rho_a$ is the density matrix for the state conditioned on only one a event having happened during the pump pulse of duration T.

Simplifying and considering that the decay of the optical cavity is much faster than the optomechanical interaction $$(T_a = \gamma_a^{-1} \ll (\alpha g_{OM})^{-1})$$

gives the heralding probability P and infidelity 1−F of a single phononic excitation:

$$P = 4\alpha^2 g_{om}^2 T_a T,$$

$$1 - F = 8\alpha^2 g_{om}^2 T_a T + \frac{3}{4}\gamma_m T_a T(3n_{th} + 1).$$

Notice the term in the infidelity that scales exactly as the heralding probability: this is due to the $(0)(\varepsilon^2)$ next-to-leading-order effect in the two-mode squeezing, leading to a proportionally larger chance of more-than-one excitation being heralded. The infidelity also includes a second term that is related purely to the detrimental effects of the thermal bath on the mechanical resonator. As long as $$k_b\tau \ll Q_{mech}\alpha^2 g_{om}^2,$$

the bath heating term can be neglected; however, this can be difficult to quantify as $Q_{mech}$ strongly depends on $\tau$. The transition between these sources of infidelity is shown in FIG. 6, which is described below.

The heralding probability and fidelity for the complete entangling protocol, in which two nodes are pumped in parallel and the photon is looked for only after "path-information erasure" differ from the heralding probability and fidelity for the single phononic excitation. To leading order, the probability for the complete entangling protocol $P_e=2P$ is twice as high as either node can produce a photon, and the infidelity scales the same ways.

For long term storage, the phononic excitation is coherently swapped into the spin. The swap gate contributes an additional infidelity of $n_{th}\gamma_m/g_{sm}$ which is much lower than other sources of infidelity.

FIG. 6 shows the heralding probability and single-phonon infidelity as functions of temperature (facet) and pump power (vertical offset), parameterized by pump pulse duration (each line spans $T=T_a$ to $T=10^3T_a$). Shorter pulses have lower probability and infidelity. However, the rate of heralding is independent of T as the shorter the pulse (the higher the repetition rate), the lower the heralding probability for that attempt. Short pump pulses lead to lower infidelity. In this particular setup, at $\tau=40$K, $\alpha=\sqrt{1000}$, and $T=T_a$, suggesting rates of successful single-phonon heralding in the tens of kHz at an infidelity lower than 10%.

FIG. 6 shows that performance is better at lower temperatures. $Q_{mech}$ depends very strongly on the bath temperature due to scattering processes among the thermal phonons. At low temperatures, only clamping losses due to the design of the resonator affect performance. At around 4 K, the detrimental effects from the bath of the mechanical resonator become negligible compared to the infidelity due to multi-phonon excitations. As the temperature increases, Akhieser and then Landau-Rumer processes become important.

FIG. 7 is a plot of the processes limiting the quality factor of a mechanical resonator. At low temperature, the clamping losses dominate (dashed horizontal line), but past a certain temperature, Akhieser (left diagonal trace) processes dominate. The Akhieser limited quality factor is $Q_A=(1/\Omega\tau)(\rho c^4/2\pi\gamma^2\kappa)$, where $\rho$ is density, c is speed of light, $\gamma$ is the Grüneisen coefficient, and $\kappa$ is the thermal conductivity. Only $\kappa$ depends strongly on temperature. At even higher temperature, Landau-Rumer processes dominate with $Q_{LR}=2\rho c^2/\pi\gamma^2 C_v\tau$, where $C_v$ is the diamond heat capacity. These estimates depend on thermal properties of bulk diamond. Thin-sheet diamond can have slightly differing properties.

Thus, an optomechanical crystal could be used to perform single-phonon generation at tens of kHz and infidelity lower than 10% at temperature $\tau=40$K, with $\alpha^2=1000$ photons in the pump mode, and a pump pulse duration $T=T_a$. At lower temperatures the performance improves significantly, giving limiting infidelities far below 1%.

Field-Programmable Spin Arrays (FPSAs) for Scalable Quantum Repeaters

Quantum repeaters or modular quantum computers may manage large numbers of multiplexed memory qubits with efficient local operations. Solid-state artificial atoms, such as color centers in diamond, are promising quantum memories. Precision control of the electronic spin ground state of color centers presently relies on alternating current (AC) magnetic fields. Developing architectures for spatially multiplexed microwave control with sufficiently low power dissipation and cross-talk remains an open challenge. Other approaches to this challenge achieve localized control using a magnetic field with a spatial gradient, or by producing a spatially varying detuning of the color center resonant frequency using a gradient magnetic or optical field combined with global magnetic addressing.

A field programmable spin array (FPSA) employs a fundamentally different approach: it uses highly localized fields—either strain or electric, depending on the color center of choice—that can be driven capacitively for low power dissipation. Electric field-based spin control and strain-field driving (also called strain driving) offer lower power dissipation and cross-talk than other approaches, as well as compatibility with integrated circuit (IC) platforms for scaling. With an efficient optical interface and all-to-all connectivity, an FPSA can be integrated to allow scalable entanglement generation.

An FPSA includes a programmable array of electrodes positioned around arrays of color centers in a diamond waveguide. An FPSA architecture includes:

(1) a quantum memory; for the electric-driving case the diamond nitrogen-vacancy (NV) center, which has already been used for optical entanglement distribution across as many as three qubits, and for strain driving, the diamond silicon-vacancy (SiV) center, which has been used to demonstrate memory-enhanced quantum communication;

(2) an efficient optical interface through a slow-light photonic crystal (PhC) waveguide enabling ~25×Purcell enhancement of the color center's coherent transition. Compared to cavity structures, the slow-light waveguide can host a large number of qubits and still maintain relatively high Purcell enhancement; and (3) an electrode array positioned along individual qubits in the waveguide.

An FPSA enables spin rotations with durations of roughly 100 nanoseconds each, as well as roughly 600 GHz DC tuning range of color center optical transitions.

The FPSA architecture addresses several challenges in the development of scalable quantum networks. Electric field control is beneficial for the individual quantum addressing of dense emitter arrays in an FPSA, as power consumption and cross-talk are significantly compared to the magnetic field case. Furthermore, the wide tunability via the Stark effect allows for multi-channel, parallelized optical entanglement schemes that offer improved scaling with number of qubits. Strain field-based FPSAs with color centers with inversion symmetry have similar advantages. These advantages make FPSA architectures well suited for forming the basis of future quantum networking implementations.

Localized Single-Qubit Control with FPSAs

FIG. 8A shows an FPSA 800. The FPSA 800 includes a single-mode diamond waveguide 810 that hosts a centered array of color centers 820, such as nitrogen vacancies (NVs) like the one illustrated in FIGS. 8B and 8C or silicon vacancies (SiVs) like the one illustrated in FIGS. 8D and 8E. The color centers 820 act as spin memories and are arrayed approximately at a periodic spacing a, i.e., the kth color center has a position $\vec{r}_k = ka\hat{z} + \vec{\delta}_k$, where $|\vec{\delta}_k|/a \ll 1$ is the error or uncertainty in the color center positioning. The waveguide 810 is on dielectric structures, also called dielectric fins 830, between electrodes 840 arranged in an array along the sides of the waveguide 810. The dielectric fins 830 and electrodes 840 are supported by a low-index substrate (e.g., a $SiO_2$ substrate). The electrodes 840 are driven by voltage sources 842a and 842b. The dielectric fins 830 shield each electrode 840 from the neighboring electrodes and concentrate the electric fields applied by the electrodes 840 in the diamond waveguide 810 around the color centers 820. The dielectric fins 830 also provide a refractive index perturbation that causes the diamond waveguide 810 to act as a broader band, slow-light waveguide as explained below.

The FPSA 800 can be made by forming the dielectric fins 830 and electrodes 840 on the substrate 850, then placing the diamond waveguide 810, which may be grown separately, on the dielectric fins 830, e.g., using pick-and-place positioning. The approach enables the dielectric fins 830 to be made of a number of different materials using atomic layer deposition followed by lithographic patterning and a lift-off process. For an FPSA 800 that uses electric field driving, described below, the dielectric fins 830 can be made of $HfO_2$ because it has a high dielectric constant of 23 in the radio frequency (RF) range and a relatively low refractive index of 1.9 at optical frequencies. This allows the fins 830 to concentrate or localize a low-frequency electric field applied to one or more of the color centers 820 by the electrodes 840 for spin coupling while guiding the optical mode. For an FPSA 800 that uses strain driving, the dielectric fins 830 can be made of piezoelectric AlN. The piezoelectric dielectric fins produce a strain field in response to voltage applied by the electrodes 840 while also periodically modulating the refractive index (n=2.16) at optical frequencies. The electrodes 840 can be made of conductive indium tin oxide (ITO) as the electrode material to reduce or minimize optical loss in the waveguide 810. Other materials suitable for use in the dielectric fins include barium titanate (BTO, $\varepsilon \sim 7000$), which can also electro-optically modulate traveling waveguide modes. The dielectric fins and substrate can be fabricated in CMOS to proximally position the electrical contacts through a back-end-of-line metallization step.

Similarly, many types of color centers 820 are suitable for use in an FPSA 800. NVs in diamond are especially suitable because of their spin-electric field coupling Hamiltonian and the high dielectric strength of diamond. Nevertheless, NVs have several drawbacks, including a low coupling strength $d_\perp'$ for electric field driving of the $|\pm 1\rangle \leftrightarrow |0\rangle$ spin transition. This low coupling strength limits the Rabi frequency $f \propto d_\perp'$ that can be achieved without driving up the power dissipation $P_E \propto 1/d_\perp'^2$ or risking electrical breakdown. One way to address this challenge is to use global microwave driving on the NV $|\pm 1\rangle \leftrightarrow |0\rangle$ transition so that individual control can be performed on the $|+1\rangle \leftrightarrow |-1\rangle$ transition, which has a roughly 50× stronger coupling to the electric field.

Other challenges with NVs include generating large arrays of NVs with lifetime-limited optical coherence. In addition, NV centers show large spectral diffusion in nanostructures. Fortunately, there are several other ways to deal with spectral diffusion in an FPSA. For example, an FPSA can use a feedback system to reduce the NV linewidth. The low capacitance of FPSA allows a short time constant for charging the system, but the feedback could increase the measurement time during the quantum entanglement generation process. Alternatively, or in addition, placing the NVs in larger multi-mode waveguides far from sidewalls may reduce spectral diffusion. The NV centers can still couple to a slow-light mode with a large Purcell factor via proper design even if the waveguide supports multiple modes.

Electric field-driven quantum gates—With color centers like NVs, the high-fidelity localized quantum gates enabled by the FPSA can be driven by electric fields applied to the color centers by the electrodes. The relevant interaction between an NV ground state spin and an electromagnetic field $\vec{E}$ and $\vec{B}$ is captured in the Hamiltonian:

$$H_{\vec{E},\vec{B}}/h = \gamma_S \vec{S} \cdot \vec{B} + d_\perp'[\{S_x', S_z'\}E_{x'} + \{S_{y'}, S_{z'}\}E_{y'}] +$$
$$d_\parallel S_{z'}^2 E_{z'} + d_\perp[(S_{y'}^2 - S_{x'}^2)E_{x'} + \{S_{x'}, S_{y'}\}E_{y'}],$$

where $d_\perp = |\hat{z}' \times (\hat{z}' \times \vec{d})| = 17$ Hz cm/V ($d_\parallel = \hat{z}' \cdot \vec{d} = 0.35$ Hz cm/V) denotes the perpendicular (parallel) part of spin-electric field susceptibility, h the Planck constant, S the electron spin operator, and $\gamma_S$ the gyromagnetic ratio. $d_\perp'$ is estimated near 1/50 $d_\perp$. Here, the primed coordinates (x', y', z') indicate the coordinates relative to the NV aligned along the z' axis.

Consider an external electric driving field $\vec{E}_{\pm1\leftrightarrow0}$ ( $\vec{E}_{+1\leftrightarrow-1}$) resonant with the $|\pm1\rangle \leftrightarrow |0\rangle$ ($|+1\rangle \leftrightarrow |-1\rangle$) ) transitions of the NV. FIG. 8B shows that these transitions are non-degenerate under a small bias magnetic field along the z'-axis. From the Schrodinger equation, the Rabi frequency of coherent driving on the NV ground state triplet is:

$$h\Omega_R^{\pm1\leftrightarrow0} = \frac{1}{\sqrt{2}}d_\perp'\left|\vec{E}_\perp(\vec{r}_k)\right|,$$

$$h\Omega_R^{+1\leftrightarrow-1} = d_\perp\left|\vec{E}_\perp(\vec{r}_k)\right|$$

where $\vec{r}_k$ indicates the positions of NVs (color centers 820) shown in FIG. 8A and $\vec{E}_\perp(\vec{r}_k)$ is the component of electric field perpendicular to NV axis. As shown in FIGS. 8B and 8C, the transition dipoles $\vec{\mu}_1=[1\bar{1}0]$ and $\vec{\mu}_2=[\bar{1}\bar{1}2]$ are taken as basis vectors for the plane perpendicular to NV axis, i.e., $\vec{E}_\perp(\vec{r}_k)=(E_{\vec{\mu}_1}(\vec{r}_k), E_{\vec{\mu}_2}(\vec{r}_k))$ where $\vec{\mu}_1$ and $\vec{\mu}_2$ are also the axes of NV optical transitions $$E_y^{op}$$

and $$E_x^{op},$$

respectively.

Absent other experimental noise, the single qubit gate fidelity is limited by the inhomogeneous dephasing time $$T_2^* \sim 10$$

μs. For a pure superposition state, the fidelity of a π-rotation at Rabi frequency $\Omega_R$ under this dephasing process is given by $$F_{dephasing} = 1/2\left(1 + \exp\left(-1/2\Omega_R T_2^*\right)\right).$$

Considering random pure states distributed uniformly on the Bloch sphere, the average fidelity reaches above 0.99 with a Rabi frequency of 1.7 MHz. For a double quantum transition, the resonant electric field should be 10 V/μm to reach this gate fidelity. In the FPSA geometry, a roughly 10 V potential difference generates an electric field of this magnitude. Fortunately, a 10 V potential difference is compatible with modern integrated-circuit technology, such as complementary metal-oxide semiconductor (CMOS) platforms. Electric field-driven Rabi frequencies can reach $$\Omega_R^{+1\leftrightarrow-1} \sim 0.13$$

GHz and $$\Omega_R^{\pm1\leftrightarrow0} \sim 1.9$$

MHz, limited by diamond's dielectric strength $$E_{bd}^{dmd} \sim 2\times10^3\,\text{V}/\mu m \text{ and } HfO_2\text{'s dielectric strength } E_{bd}^{HfO_2} \sim$$

$$1.6\times10^3\,\text{V}/\mu m$$

at a separation of hundreds of nanometers for a diamond waveguide and HfO₂ dielectric fins.

FIGS. 9A-9C illustrate the electric field profile of an example FPSA 800 configured to implement electric field-driven quantum gates. More specifically, FIG. 9A plots the $|\vec{E}_\perp(x, y, z=0)|$ electric field component obtained from Maxwell's equations using COMSOL Multiphysics when a voltage $$V_k = V_k^t - V_k^b = 50 \text{ V}$$

is applied in an FPSA with parameters in TABLE 1 (below). FIG. 9B shows the electric field component with additional cross-talk compensation (discussed below).

In FIGS. 9A and 9B, the electric field component is overlaid on an outline of the FPSA 800, with one color center 820 between each pair of electrodes 840 in the electrode array. A single color center 820 and corresponding pair of electrodes 840 form a unit cell 822 in the FPSA 800 along with the segment of the waveguide 810 containing the color center 820 and the dielectric fin 830 between the pair of electrodes 840. The electrodes 840 applying the electric field are shaded; the other electrodes 840 are not.

TABLE 1

| FPSA Parameters | | | |
| --- | --- | --- | --- |
| | Symbol | Value (Electric) | Value (Strain) |
| Spin memory spacing | α | 183 nm | 488 nm |
| Diamond y-dimension | $h_{wg}$ | 91 nm | 91 nm |
| Diamond z-dimension | $w_{wg}$ | 364 nm | 410 nm |
| HfO₂/AlN x-dimension | $l_{fin}$ | 91 nm | 98 nm |
| HfO₂/AlN y-dimension | $h_{fin}$ | 273 nm | 273 nm |
| HfO₂/AlN z-dimension | $w_{fin}$ | 500 nm | 500 nm |

Strain-driven quantum gates—With color centers that have inversion symmetry, like SiVs and other Group-IV color centers, the high-fidelity localized quantum gates enabled by the FPSA 800 can be driven by a strain field instead of an electric field. (Due to their inversion symmetry, the spin and orbital transitions of Group-IV emitters are almost immune to electric fields.) The Rabi frequency when an oscillating strain field is resonant with the $|e_{g+}\uparrow\rangle \leftrightarrow |e_{g-}\downarrow\rangle$ transition of a SiV is:

$$\Omega = \frac{\gamma_S\sqrt{\beta^2 + \gamma^2}\,B_\perp}{\lambda_{SO}},$$

where $\beta$ and $\gamma$ are the magnitudes of transverse AC strain fields that couple to the SiV spin, $B_\perp$ is a static transverse magnetic bias field, and $\lambda_{SO}$ is the spin-orbit coupling strength. Consider a resonant strain field generated in an FPSA structure as shown in FIG. 8D, where the electric field produces a strain field in piezoelectric AlN dielectric fins 830.

FIGS. 9D-9F illustrate the Rabi frequency induced by a strain field in an FPSA when a voltage $$V_k = V_k^t - V_k^b = 2 \text{ V}$$

is applied, assuming a transverse bias field of $B_\perp = 0.17$ T. Again, TABLE 1 lists the device parameters. FIG. 9D shows the Rabi frequency when the voltage sources 842a and 842b drive a single electrode pair. FIG. 9E shows the Rabi frequency with several electrodes driven to suppress cross-talk (discussed below).

In FIGS. 9D and 9E, the electric field component is overlaid on an outline of an FPSA 800' configured for strain driving with SiVs as the color centers 820'. The electrodes 840 are placed on opposite sides of AlN dielectric fins 830', off-center from the emitters (color centers) 820', with four total electrodes 840 per unit cell 822'. Again, the electrodes 840 applying the electric field are shaded; the other electrodes 840 are not. These added controls allow for manipulation over the additional degrees of freedom of strain fields as compared to electric fields. A $\pi$ rotation of the spin degree of freedom with a fidelity F=0.99 can be achieved with a roughly 0.001 V potential difference, which is within the range of modern integrated-circuit technology, such as CMOS platforms.

Control cross-talk—The closest separation between individually controllable color centers (e.g., NVs or SiVs) in an FPSA is limited by the cross-talk between the target color center at location $\vec{r}_k$ and its nearest-neighbor color center at $\vec{r}_{k+1}$. During a $\pi$-pulse on qubit $\vec{r}_k$, there is an undesired rotation on $\vec{r}_{k+1}$. Comparing $R(\vec{r}_{k+1})$ and desired identity operation $I(\vec{r}_{k+1})$ gives the cross-talk fidelity $F_C$, which can be expressed as $$F_C\big(R(\vec{r}_{k+1}), I(\vec{r}_{k+1})\big) = \left(tr\sqrt{\sqrt{\rho}\,\sigma\sqrt{\rho}}\,\right)^2,$$

where $$\rho = R(\vec{r}_{k+1})\big|\psi_0(\vec{r}_{k+1})\big\rangle\big\langle\psi_0(\vec{r}_{k+1})\big|R^\dagger(\vec{r}_{k+1})$$

$$\sigma = I(\vec{r}_{k+1})\big|\psi_0(\vec{r}_{k+1})\big\rangle\big\langle\psi_0(\vec{r}_{k+1})\big|I^\dagger(\vec{r}_{k+1})$$

and $|\psi_0(\vec{r}_{k+1})\rangle$ is the initial quantum state of color center at location $\vec{r}_{k+1}$. For the profile shown in FIG. 2A, $$F_C^{fin} = 0.92.$$

The field confinement provided by the HfO$_2$ fins results in a significant improvement over bare electrodes, where $$F_C^{bare} = 0.69.$$

For the localized strain driving structures shown in FIG. 9D, the cross-talk fidelity is 0.88. Without being limited by any particular theory, the cross-talk fidelity for strain tuning is lower than that of the electric field case because the acoustic wavelength ($\sim\mu m$) is comparable with the device size. A propagating acoustic wave is launched along the waveguide, which makes it more difficult to localize the strain field compared to the electric field.

Cross-talk suppression—Individual control over the 2N voltages $$V = \left\{V_k^{t(b)}\right\}$$

applied the respective electrodes reduces or eliminates the driving field at the locations of the non-target qubits (color centers), further suppressing cross-talk. The electric field applied on each qubit $\vec{E}_\perp = \{E_{\mu_1}(\vec{r}_k), E_{\mu_2}(\vec{r}_k)\}$ has a linear dependence with the voltage by $$\vec{E}_\perp = GV,$$

where $G_{ij}$ is the linear map between $E_i$ and $V_j$. The electrode voltages V are then chosen to reduce or minimize the cross-talk by $V_{CE} = G^{-1}\vec{E}_{tar}$. For the case of a single qubit gate on a target NV (color center 820) at location i, $$\vec{E}_{tar} = \vec{E}_{\perp,tar}^T \otimes_K \delta_{ik} \text{ and } \vec{E}_{\perp,tar}$$

is the AC electric field applied on the target NV. This inversion is possible because the number of independent degrees of freedom is equal to the number of electric field values to be minimized. As shown in FIGS. 9B and 9C, this cross-talk suppression process creates low electric fields on non-target NV positions, increasing the cross-talk fidelity to $F_{CE} > 0.99$. The misalignment tolerance of the NV position within the color center array to achieve this fidelity is 18 nm (73 nm) for the first (second) nearest neighbors shown in FIG. 9C. Now, the total infidelity is caused mainly by dephasing rather than cross-talk. This procedure can be used for any arbitrary operations over all NVs by choosing a specific $\vec{E}_{\perp,tar}$ as described above.

Although the strain field is a tensor, a similar cross-talk elimination process can be applied for strain tuning, FIGS. 9E and 9F show that the cross-talk fidelity can go to F=0.99 with a misalignment tolerance of the NV position of about 110 nm along the z-axis. The distance along the z-axis to achieve a cross-talk fidelity F=0.99 is 1.2 μm (0.36 μm) for the strain (electric) field, meaning the electric field can be more localized in an FPSA than in other architectures.

There are other ways to suppress cross-talk in a strain-based FPSA. In the strain-based FPSA shown in FIGS. 9A and 9B, the piezoelectric fins launch acoustic waves along the waveguide, inducing a large cross-talk along waveguide direction. The acoustic mode can be localized using other acoustic transducers, such as interdigital transducers (IDTs).

A co-designed photonic-phononic bandgap structure can also be used to localize acoustic waves.

Heat load for electric field versus magnetic-field-based spin control—Heat dissipation is critically important in cryogenic environments, where cooling power is limited and heating can degrade performance. The low-temperature stage power consumption of electric field-based coherent control can be approximated by modeling the FPSA as a capacitance C with a parallel resistance R in series with a wire (resistance $R_w \sim 10^{-2} \Omega$) inside the cryogenic environment. A suitable figure of merit for assessing the low-temperature state power consumption is the energy per spin π-pulse that is deposited at the low-temperature stage. The FPSA acts as an open circuit, and almost all the power is reflected back to the high temperature region. For $|+1\rangle \leftrightarrow |-1\rangle$ transition, the energy dissipation in the cryostat is given by:

$$J_E = \frac{1 + \omega^2 C^2 R_w R}{R} \frac{\Lambda^2 \Omega_R}{4 d_\perp^2},$$

where ω is the frequency of the AC electric field and $\Lambda \sim 1$ μm is the characteristic length that relates the applied voltage on the FPSA and electric field at the positions of NVs. In our geometry, $C = 4.9 \times 10^{-17}$ F is the circuit capacitance simulated by FEM analysis and R $\sim 10^{20}\Omega$ is the resistance of the $HfO_2$ dielectric films calculated from thin film resistivity. The energy dissipation in the cryostat per π-pulse $J_E$ for a Rabi frequency $\Omega_R = 1.7$ MHz is $1.4 \times 10^{-21}$ J with a peak maximum current I=98 mA.

A second figure of merit for assessing the low-temperature state power consumption is the dissipation ratio between electric field and magnetic field-based driving with the same Rabi frequency, $J_E/J_B$. Here, the magnetic circuit is taken to be bare wire with a resistance $R_w$ and a capacitance $C_w$, with the NV positioned at a distance Λ from the wire. Then the ratio is given by:

$$\frac{J_E}{J_B} \sim \frac{\mu_0^2 \gamma^2}{4 \pi^2 d_\perp^2} \frac{1 + \omega^2 C^2 R_w R}{R_w R}$$

where $\mu_0$ is the vacuum permeability. Here $J_E/J_B = 1.0 \times 10^{-5}$, suggesting the power dissipation for electric field control is six orders of magnitude lower than that for magnetic field control. For driving a single quantum transition $|0\rangle \leftrightarrow |\pm 1\rangle$, $J_E/J_B = 5.0 \times 10^{-2}$.

In a practical case, leakage current should be considered too. For a ~PΩ leakage resistance, $J_E/J_B = 1.2 \times 10^{-4}$ ($6.0 \times 10^{-1}$) for $|+1\rangle \leftrightarrow |-1\rangle$ ($|\pm 1\rangle \leftrightarrow |0\rangle$) transitions.

A similar calculation can be made for a strain-based FPSA. Assuming a transverse bias field of $B_\perp = 0.17$ T as used in prior work with $U_e = 0.14$ V to reach $\Omega_R = 20$ MHz and a ~PΩ leakage resistance, the heat load per π-pulse in the low temperature part for this circuit is $2.5 \times 10^{-25}$ J. For a comparison with microwave control, assume $\beta = -1.29 \times 10^2$ GHz based on and the heat load ratio $J_S/J_B = 8.9 \times 10^{-9}$. Here, consider only the heat load in the low temperature part. For the high temperature part, the heat generated on the transmission line for strain-based FPSA is $2.5 \times 10^{-12}$ J with a peak current of 1.4 mA, which is much larger than the heat load in cryogenic stage.

Efficient Coupling of a Color Center Array to a Slow-Light Photonic Crystal Waveguide The entanglement rate of NV centers relies on the spin-photon coupling efficiency, which is given by:

$$\beta = \frac{F_P \cdot \Gamma_{wg0}}{F_P \cdot \Gamma_{wg0} + \Gamma_{others}},$$

where $\Gamma_{wg0}$ is the decay rate of spin-entangled transition in the absence of any optical structures, and $\Gamma_{others}$ the total rate of all other decay mechanisms. Slow-light waveguide structures produce a photonic bandgap, resulting in a small group velocity near the band edge. As a result, an emitter (color center) placed in the mode maximum of a slow-light waveguide experiences a large enhancement in the local density of electromagnetic states, and its rate of transition is enhanced by the Purcell factor, $F_p$.

Conveniently, the dielectric fins provide a periodic dielectric perturbation, forming a slow-light mode in the optical band. FIG. 10A indicates the TE-like modes of the slow-light waveguide with the parameters shown in TABLE 1. It shows the $$E_y^{op}$$

transition of the NV center with a frequency $\nu_0$. Coupling the NV transition at $\nu_0$ to the slow-light region funnels the coherent emission into waveguide modes near wave-vector $k_x(\nu_0)$, as shown in FIG. 10A. Finite difference time domain (FDTD) simulations yield a maximum Purcell factor of $F_{Pmax} = 25$ for an NV in the crystallographic [111] direction placed on the mid-plane of the diamond waveguide for 100 periods (unit cells 822).

The total photon collection efficiency out of the waveguide is given by $\eta_{wg} = \beta \exp(-t_{wg}N)$, where $t_{wg}$ is the waveguide transmission from the emitter to the waveguide facet. Assuming a NV Debye-Waller factor of DW=0.03 and using the relation $\Gamma_{others}/\Gamma_{total} = 1 - DW$ gives $\beta = 25\%$. The transmission loss $t_{wg} \sim 8 \times 10^{-4}$ dB/period is estimated from FDTD simulations.

Spectral addressing by localized optical tuning—The electrodes can also be used to selectively couple the waveguide propagating modes to a specific color center in the array. To do this, the electrodes tune the optical transition frequency of individual color centers. In the case of NVs under electric field control, the electrodes can shift the emitter's natural $E_y^{op}$ transition at $\nu_0$ to $\nu_0 + \Delta \nu_0$, where $\Delta \nu_0$ is given by:

$$h\Delta\nu_0 = \Delta\mu_\| E_\| - \frac{\sqrt{2}}{2} \mu_\perp \sqrt{E_{\vec{\mu}_1}^2 + E_{\vec{\mu}_2}^2},$$

where $E_\|$ is the electric field along the crystallographic $$\Delta\mu_\| = \mu_\|^{GS} - \mu_\|^{ES} \sim 1.5 \, D$$

is the parallel dipole moment difference between excited states and ground states, and $\mu_\perp \sim 2.1$ D is the perpendicular component of electric dipole moment. Choosing the $E_y^{op}$ transition avoids the depopulation and mixing of excited states at large applied fields.

The maximum tuning range using this effect is about 600 GHz assuming an applied electric field of $10^2$ V/µm in the FPSA architecture, indicated by the shaded area in FIG. 10B. This corresponds to tuning across the full range of the slow-light Purcell enhancement and into the waveguide bandgap. As the Purcell-enhanced NV zero phonon line (ZPL) transition linewidth is about 100 MHz, the wide range of the Stark tuning allows multiple-frequency channels in which NVs can be individually addressed in the frequency domain. FIG. 10B shows three channels (Ch1-Ch3) spaced by 40 GHz and an off-resonant channel (Ch0). The Purcell enhancement across Ch1-Ch3 is maintained at about 10, while the 40 GHz spacing suppresses interactions (e.g., photon absorption) between channels. An analogous effect can be achieved using strain tuning.

The ability to locally reconfigure the electric field profile in an FPSA allows for arbitrary and independent configurations of NV optical transitions. Unlike in the electric field-driven case where the $E_\parallel$ is neglected, the strain-driven case uses a total of 3N degree of freedoms to control components $E_\parallel$, $E_{\vec{\mu}_1}$ and $E_{\vec{\mu}_2}$ for the N NVs. However, the symmetry $V_t + V_b = 0$ makes it possible to set $E_\parallel = E_{\vec{\mu}_2} = 0$ in the ideal case. The remaining N degrees of freedom can be used to set $E_{\vec{\mu}_1}$, for the NVs.

Together, FIGS. 10C and 10D shows two configurations in an FPSA. The upper curve in FIG. 10D shows the frequency shift for the electric field profile in FIG. 10C, resulting in two NVs on resonance. The lower curve in FIG. 10D shows the frequency shift for a different voltage setting, where two NVs are in different channels without interaction. In both cases, the other NVs are off-resonant in Ch0. The ability to dynamically control the NV transition frequency via electrical control can then be used to perform individual emitter initialization and readout, and to reconfigure quantum network connectivity as described below.

Quantum Repeater Performance

FIG. 11A shows an FPSA used as a quantum repeater to generate Bell pairs $|\psi_{AB}\rangle$ between two memory qubits at Alice and Bob (A and B). There are quantum repeater protocols that use quantum emitters as quantum memories and multiplexing schemes that achieve all-to-all connectivity. An FPSA can improve the quantum repeater performance via an improved scaling with number of qubits.

The quantum repeater protocol in FIG. 11A has two steps:

(1) Distant entanglement between A(B) and electron spin $|j_e\rangle$ ($|k_e\rangle$) in the FPSA using a heralded single-photon scheme, followed by swapping to the $^{15}$N nuclear spin $|j_n\rangle$ ($|k_n\rangle$). For each link, there is a length-L noiseless channel with transmission $\eta = \exp(-\gamma L)$, where $\gamma = 0.041$ km$^{-1}$. Each entanglement attempt has a success probability of $p_1 = 2\alpha\eta p_d p_c \eta_{wg}/2$, where $p_d = 0.83$ ($p_c = 0.33$) is the detection (quantum frequency conversion, if necessary) efficiency. Conservatively, the fidelity is kept low, $F_P = 10$ ($\beta = 25\%$), to avoid high loss and fabrication sensitivity in the regime of high group index $\alpha = 0.01$ to keep the two-photon excitation error below 1%.

(2) Local entanglement swapping to generate entanglement between A and B:

a. First, color center electron spins $|j_e\rangle$ and $|k_e\rangle$ are Stark-shifted to the same optical transition and entangled via the two-photon Barrett-Kok scheme with success probability $p_2 = (p_d \eta_{wg})^2/2$.

b. Then, a controlled NOT (CNOT) gate is performed between electron spin and nuclear spin to establish the local entanglement, before Bell measurements in the electron-nuclear spin basis of the memories j and k swap the local entanglement to distant entanglement of A and B after subsequent feed-forward. This makes use of the FPSA's all-to-all connectivity to realize a 'quantum router' architecture that reduces or minimizes the latency (waiting time and associated decoherence) and local buffer size.

To evaluate the performance, consider the entanglement rate $\Gamma_{AB}$, defined as the average number of generated Bell pairs $|\psi_{AB}\rangle$ per second, to be the figure of merit. For two qubits, $\Gamma_{AB}$ is the inverse of total time used for single pair entanglement generation. Parallel operations of N pairs can increase this rate by a factor of N. The FPSA time-multiplexes spin-photon entanglement to A and B, sending spin-entangled photons from different emitters in short succession. It is implemented by Stark-shifting the optical transition of selected color centers j and k from Ch0 to Ch1 and Ch2 (shown in FIG. 11A), while the 'unselected' color centers remain in Ch0. After an entanglement generation attempt, the NVs j, k are tuned back into Ch0 and the process is repeated with the subsequent pair of NVs j, k=j+1, k+1 as shown in FIG. 11A. In this way, time-multiplexing channels allow $N_{ch} = t_{link} t_{ph}$ qubits operate in parallel, where $t_{link}$ is the heralding time for an optical pulse traveling photon in the fiber link and $t_{ph}$ is the color center photon lifetime.

For a 1 km link and 10 ns lifetime, there are $N_{ch} \sim 300$ time-multiplexing channels. Additional frequency channels can further raise the number of time-frequency bins for distant entanglement generation. The Stark shift tuning range, bandwidth of the slow-light effect, qubit linewidth, and frequency multiplexer bandwidth limit the number of multiplexing channels. In an FPSA, the regime of the Purcell factor >10 has a bandwidth of about 200 GHz, setting the total frequency range. For dense wavelength division multiplexing, the frequency multiplexer bandwidth is 20 GHz bandwidth. This gives an FPSA time-frequency channel capacity of 10 $t_{link}/t_{ph}$. In a regime with fewer qubits than the channel capacity, each qubit pair can effectively generate entanglement independently. Above this threshold, qubits may compete for channel usage.

The same dynamically tunable operations enable attempts at local entanglement as soon as distant entanglement is heralded. After a heralding signal from both A and B, the FPSA shifts both qubits j, k to Ch3 and generates local entanglement as described above. Due to localized independent electric field-based control, the FPSA can perform parallelized local entanglement generation (step 2) while simultaneously attempting entanglement over the long-distance links (step 1) using other qubits (e.g., j, k=j+1, k+1) rather than performing operations sequentially. The entanglement rate is then mainly limited by the first step.

While increasing qubit number linearly increases the entanglement rate $\Gamma_{AB}$ in the ideal case, each additional qubit adds exponential loss to the FPSA as larger FPSA size leads to transmission $\eta_{wg} \propto \exp(-t_{wg}N)$. The entanglement rate is given by $\Gamma_{AB} \propto N\exp(-t_{wg}N)$, as shown in the upper curve in FIG. 11B for parameters given in TABLE 1. The FPSA reaches a maximum entanglement rate of $\Gamma_{AB} = 2.1 \times 10^4$ ebits/s when the number of qubits is N=1824, after which loss decreases rate exponentially with increasing number of qubits.

The lower curve in FIG. 11B shows the entanglement rate by a Mach-Zehnder interferometer (MZI) tree architecture as a comparison assuming a 0.4 dB loss per MZI. In the limit of large qubit number, the entanglement rate scales linearly with N. With very large qubit numbers, the MZI architecture could outperform the FPSA because it does not suffer from exponential loss. However, the number of parallel qubits is limited by the time-frequency multiplexing channel capacity. For a 1 km link, the channel capacity is $10\, t_{link}/t_{ph} \sim 3000$ as shown in FIG. 11B. In this regime, the FPSA outperforms the MZI architecture by a factor of about three.

FIG. 11C (inset) shows a hybridization of FPSA and MZI tree architectures. The qubits are divided into $N_{dev}$ FPSAs connected by an MZI tree. FIG. 11C also shows the entanglement rate $\Gamma_{AB}$ as a function of the number of qubits with different $N_{dev}$. The dashed line represents the maximum rate envelope taking the optimal $N_{dev}$ for each qubit number. Instead of exponential decay, the optimal envelope asymptotically follows a linear scaling. In this scheme, the rate is limited by time-frequency multiplexing channels capacity shown in the right-most region (>3000 qubits) in FIG. 11C. For different link lengths, the channel limit changes, resulting in varied maximum rate as shown in FIG. 11D. The rate can be straightforwardly increased with additional frequency-multiplexing channels. Alternatively, a fixed number of memories N can be used more efficiently in schemes with a midway entangled photon pair source, increasing the entanglement rate from $\propto\eta$ to $\sqrt{\eta}$.

FIG. 16 is a plot of the change in the entanglement rate per added qubit for an FPSA (decreasing trace), MZI trees (middle trace), and hybrid FPSA/MZI architectures (discontinuous trace). In the low number of qubits regime, adding qubits to an FPSA increases the entanglement rate rapidly due to the linear dependence of N. However, each additional qubit adds exponential loss. In the large number of qubits regime, the exponential loss dominates, causing a decrease in the entanglement rate when N>1824. The MZI tree shows increased entanglement rates in both regimes but shows a low increasing rate. The hybridization device of FPSA and MZI tree architectures shows large increase entanglement rate in all regimes, but the efficiency for adding qubits decreases in the large number of qubits regime. The discontinuities in the trace for the hybrid structures are due to the changes in the number of devices.

Electric Field Confinement by Dielectric Fins

FIG. 9A (described above) shows the electric field profile of an electric field-based FPSA (eFPSA) that uses a dielectric fin structure to confine the electric field. For a comparison, FIG. 12 shows the field profile of an FPSA 1200 without dielectric guiding fins. Removing the dielectric fins reduces the field maximum and the spatial refinement by a factor of 1.7, resulting in a cross-talk fidelity of F=0.66.

FPSA Equivalent Circuits

FIGS. 13A and 13B show equivalent circuit models of electric field-driven and strain-driven FPSAs, respectively. In each case, the FPSA itself is modeled as a capacitor C and a parallel resistance R. Inductance is neglected because $\omega L \ll 1/\omega C$ in the FPSA. The FPSAs are at low temperature (LT; right of the dashed line) and the other components are at room temperature (RT; left of the dashed line).

In FIG. 13A, a voltage source U is connected to the (e)FPSA by a resistance $R_S$ and a transmission line with length $l=l_1+l_2$. Here $l_1$ ($l_2$) is the length of transmission line in low temperature (room temperature) part. The low temperature part contains the FPSA, a series resistance $R_w$ with a parallel wire capacitor $C_w \sim fF/\mu m$ and a transmission line with length $l_2 \ll c/f \sim 0.15$ m. The room temperature part contains a transmission line with length $l_1 \gg l_2$ and a voltage source U. Neglecting the wire capacitor $C_w$ because $R_w \ll 1/j\omega C_w$, the impedance of the low-temperature part is:

$$Z_{LT} = Z_0 \frac{Z_C + jZ_0\tan(\beta l_2)}{Z_0 + jZ_C\tan(\beta l_2)} \approx Z_C$$

where $Z_0=50\Omega$, $\beta=2\pi/\lambda$ the wavenumber, and $$Z_C = \frac{R(1 - j\omega CR)}{1 + \omega^2 C^2 R^2} + R_w$$

Similar to the open circuit, the potential difference across the eFPSA is:

$$U_e = \frac{2Z_C}{Z_C + Z_0}U \sim 2U,$$

where $U_0$ is the source voltage. The voltage on the eFPSA is $2U_0$ and the current is almost zero.

The heat load per $\pi$-pulse in the low temperature part is:

$$J_E = \left(\frac{(U_e)^2}{R} + \left|\frac{U_e}{1/j\omega C}\right|^2 R_w\right)\frac{1}{4\Omega_R},$$

with $$U_e = \frac{\Omega_R \Lambda}{d_\perp},$$

giving a heat load per pulse of:

$$J_E = \frac{1 + \omega^2 C^2 R_w R}{R}\frac{\Lambda^2 \Omega_R}{4d_\perp^2}.$$

FIG. 13B shows an equivalent circuit for magnetic field-based spin control. Here, the low temperature part is modeled as a wire capacitor $C_w$ and a parallel resistance $R_w$ because $R_w \ll 1/j\omega C_w$. The heat load per $\pi$-pulse in the low temperature part for this circuit is:

$$J_B = \frac{\pi^2}{\mu_0^2\gamma^2}d^2 R_w \Omega_R$$

where d is the distance between wire and NV centers. If $\Lambda=d$, then:

$$\frac{J_E}{J_B} \sim \frac{\mu_0^2\gamma^2}{4\pi^2 d_\perp^2}\frac{1 + \omega^2 C^2 R_w R}{R_w R}.$$

Similarly, the power dissipation of the strain-based FPSA can be written as:

$$J_S = \left( \frac{U_e^2}{R} + \left| \frac{U_e}{1/j\omega C} \right|^2 R_w \right) \frac{1}{4\Omega_R}$$

Here $$\Omega_R = -\frac{\gamma_S \sqrt{\beta^2 + \gamma^2} B_\perp}{\lambda_{SO}}$$

where $\beta$ and $\gamma$ are the magnitudes of transverse AC strain fields that couple to the SiV spin, $B_\perp$ is a static transverse magnetic bias field, and $\lambda_{SO}$ is the spin-orbit coupling strength. The capacitance of the strain-based FPSA is $C = 3.5 \times 10^{-17}$ F. Assuming a transverse bias field of $B_\perp = 0.17$ T as used in prior work with $U_e = 0.14$ V to reach $\Omega_R = 20$ MHz and a ~P$\Omega$ leakage resistance, the heat load per $\pi$-pulse in the low temperature part for this circuit is $2.5 \times 10^{-25}$ J.

As a comparison, the heat load per $\pi$-pulse in the low temperature part for microwave control is:

$$J_B = \frac{\pi^2 d^2}{\mu_0^2} R_w \frac{\Omega_R \lambda_{SO}^2}{\gamma_S^2(\beta^2 + \gamma^2)}.$$

Here, $\beta = -1.29 \times 10^{11}$ Hz and the heat load per $\pi$-pulse in the low temperature part for microwave control is $1.7 \times 10^{-17}$ J. This gives $J_S/J_B = 8.9 \times 10^{-9}$, neglecting leakage current.

Field Localization with Electric and Magnetic Field-Based Spin Driving

FIG. 14 presents a comparison of the localizations of electric and magnetic fields for different example device geometries. The magnetic field device geometries include color centers subject to magnetic fields generated with two lines, a loop, and a loop and feed lines as shown at the top of FIG. 14 as well as with a single line (not shown). The electric field device geometry comprises an electrode pair on opposite sides of a color center as shown at the top right of FIG. 14 and in FIG. 8A. The distance between the color center and nearest structure (e.g., loop, line, or electrode) is $a = 250$ nm for each device geometry.

FIG. 14 also includes a plot of the calculated field profiles, using the Biot-Sarvart law for the magnetic field geometries and an FEM simulation for the electric field geometry. The field is normalized at $z = 500$ nm for comparison. For a single wire, the magnetic field falls slowly with $B \propto 1/r$. Structures with two opposing currents locally cancel the magnetic field. The magnetic field from these structures (two lines and loop) falls off as $B \propto 1/r^2$ and $B \propto 1/r^3$. However, the loop may be connected by feed lines for transferring current as shown in FIG. 14, limiting the scaling by $B \propto 1/r^2$. In the electrode pair in the electric field case, the electric field scales as $E \propto 1/r^3$. For an eFPSA with many pairs of electrodes, the electric field scales as $E \propto 1/r^3$ despite connecting the electrodes to ground to help localize the electric field.

Entanglement Generation with Superradiance in a Photonic Crystal Waveguide

FIGS. 15A-15F illustrate an entanglement scheme for an NV pair in a photonic crystal waveguide. Two NVs are prepared in the state $|\Psi\rangle = |11\rangle + |01\rangle + |10\rangle + |00\rangle$ and $|0\rangle$ is excited to $|E_y\rangle$, as shown in FIGS. 15A and 15B. The spontaneous emission of each component of $|\Psi\rangle = |11\rangle + |E_y$ $1\rangle + |1E_y\rangle + |E_yE_y\rangle$ can be treated individually as follows. The $|11\rangle$ state remains unchanged under optical emission timescales. The $|E_y1\rangle$ or $|1E_y\rangle$ states emit a single photon with spontaneous emission rate $\Gamma_{sp} = 100$ MHz (FIG. 15C), where the Purcell factor is taken to be 10. Due to the superradiance effect in the photonic crystal waveguide, the $|E_yE_y\rangle$ state first radiatively decays with rate $2\Gamma_{sp}$ to the bright Dicke state $|B\rangle = |E_y0\rangle + e^{ikL}|0E_y\rangle$, where L is the distance between two NVs and k is the photon wavevector. Then another photon is emitted when the Dicke state decays to the ground state at rate $2\Gamma_{sp}$. The decay rate of $2\Gamma_{sp}$ is the critical difference between independent emission and super-radiant emission in the photonic crystal waveguide.

In the quantum entanglement generation scheme, the main infidelity is misheralding. Upon single photon detection, the desired state is $|\Psi_0\rangle = |01\rangle + |10\rangle$ following from the $|E_y1\rangle + |1E_y\rangle$ state. However, a single photon can also be detected after the spontaneous emission by $|E_yE_y\rangle$ and subsequent loss, in which case the state is $|00\rangle$ and misheralding has occurred. In the single photon scheme, the probability of $|E_yE_y\rangle$ is reduced by preparing a superposition state $|\alpha\rangle = \sqrt{\alpha}|0\rangle + \sqrt{1-\alpha}|1\rangle$. By choosing an $\alpha$ factor, the fidelity $F = 1 - \alpha$ can be traded off with the entanglement rate $r = 2\alpha p_{det}$. In the Barrett-Kok scheme, this error is eliminated by flipping the spin and repeating the optical heralding process, where a second photon detection is not possible from the $|11\rangle$ state. This two-step scheme leads to an entanglement rate $$r = p_{det}^2/2.$$

The change of the lifetime in a slow-light waveguide offers a potential path to decrease the infidelity due to misheralding. Since the emission from the desired state has a longer lifetime, we can differentiate superradiance and standard cases. Specifically, the detection of a single photon at t results in a fidelity:

$$F = \frac{\exp(\Gamma_{sp}t)}{2 + \exp(\Gamma_{sp}t)}$$

However, the probability density for detecting a photon at $t \to t + dt$ is:

$$p(t) = \Gamma_{sp}\exp(-\Gamma_{sp}t)$$

Finally, the rate-fidelity trade-off for this process can be written as:

$$p = \frac{1-F}{2F}$$

As shown in FIG. 15E, the photon detected after $t_0 = 53$ ns heralds the entanglement generation with a fidelity $F > 0.99$. The probability to get a photon after $t_0 = 53$ ns is $p = 5 \times 10^{-3}$. FIG. 15F shows a comparison of entanglement rates for several schemes with F = 0.99. Used alone, the time-domain filtering does not give an advantage over other scehmes. However, timing information can be recorded in conjunction with other schemes. For example, a photon detection at $t > t_0$ already heralds high-fidelity entanglement in a Barret-Kok scheme, rendering the second heralding step unnecessary for eliminating heralding error. The combination of the Barrett-Kok scheme and superradiance gives the highest rate when photon detection efficiency $p_{det} > 3 \times 10^{-2}$.

Strain Tuning in an FPSA

FIGS. 17A-17D illustrate strain tuning in an FPSA with SiV color centers. FIG. 17A shows the transverse electric (TE)-like modes of the slow-light waveguide in the FPSA with the parameters shown in TABLE 1 (above). Coupling the SiV transition at $v_0$ to the slow-light region funnels the coherent emission into waveguide modes near wave-vector $k_x(v_0)$, as shown in FIG. 17B.

The mean ZPL frequency $\Delta_{ZPL}$ and ground state (excited state) orbital splittings $\Delta_{gs}$ ($\Delta_{es}$) can be written as a function:

$$\Delta_{ZPL} = \Delta_{ZPL,0} + (t_{\parallel,es} - t_{\parallel,gs})\epsilon_{zz} + (t_{\perp,es} - t_{\perp,gs})(\epsilon_{xx} + \epsilon_{yy})$$

$$\Delta_{gs} = \sqrt{\lambda_{SO,gs}^2 + 4[d_{gs}(\epsilon_{xx} - \epsilon_{yy}) + f_{gs}\epsilon_{yz}]^2 + 4[-2d_{gs}\epsilon_{xy} + f_{gs}\epsilon_{zx}]^2}$$

$$\Delta_{es} = \sqrt{\lambda_{SO,es}^2 + 4[d_{es}(\epsilon_{xx} - \epsilon_{yy}) + f_{es}\epsilon_{yz}]^2 + 4[-2d_{es}\epsilon_{xy} + f_{es}\epsilon_{zx}]^2}$$

TABLE 2 (below) lists the strain terms and definitions. Considering the C transition of SiV, the optical shift caused by strain is:

$$\Delta = \Delta_{ZPL,zz} + \sqrt{\lambda_{SO,gs}^2 + 4\Delta_{gs1}^2 + 4\Delta_{gs2}^2} -$$
$$\lambda_{SO,gs} + \sqrt{\lambda_{SO,es}^2 + 4\Delta_{es1}^2 + 4\Delta_{es2}^2} - \lambda_{SO,es}$$

In principle, there should be five degrees of freedoms in the spectral addressing process. However, $\Delta_{es1}$ and $\Delta_{es2}$ ($\Delta_{gs1}$ and $\Delta_{gs2}$) have similar structure and the tolerance of the spectral addressing is similar with the bandwidth of the frequency multiplexer (20 GHz), so spectral addressing can work with three degrees of freedoms. FIG. 17C shows that there are four electrodes (degree of freedoms) for each single spin in the FPSA. FIGS. 17C and 17B both show spectral addressing where the center spin in the FPSA is set to have a 20 GHz strain tuning while all other spins in the FPSA have less than 0.3 GHz strain tuning, showing the feasibility to tune the optical transition based on the voltage settings.

TABLE 2

Strain Parameters

| Strain | Value |
|---|---|
| $t_{\parallel,es} - t_{\parallel,gs}$ | $-1.7 \pm 0.1$ PHz/strain |
| $t_{\perp,es} - t_{\perp,gs}$ | $0.078 \pm 0.009$ PHz/strain |
| $d_{gs}$ | $1.3 \pm 0.1$ PHz/strain |
| $d_{es}$ | $1.8 \pm 0.2$ PHz/strain |
| $f_{gs}$ | $-1.7 \pm 0.1$ PHz/strain |
| $f_{es}$ | $-3.4 \pm 0.3$ PHz/strain |
| $\Delta_{gs1}$ | $d_{gs}(\epsilon_{xx} - \epsilon_{yy}) + f_{gs}\epsilon_{yz}$ |
| $\Delta_{gs2}$ | $-2d_{gs}\epsilon_{xy} + f_{gs}\epsilon_{zx}$ |
| $\Delta_{es1}$ | $d_{es}(\epsilon_{xx} - \epsilon_{yy}) + f_{es}\epsilon_{yz}$ |
| $\Delta_{es2}$ | $-2d_{es}\epsilon_{xy} + f_{es}\epsilon_{zx}$ |
| $\Delta_{ZPL,zz}$ | $(t_{\parallel,es} - t_{\parallel,es})\epsilon_{zz}$ |

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A field programmable spin array comprising:
a substrate;
a waveguide;
an array of color centers formed in the waveguide;
an array of electrodes disposed on opposite sides of the waveguide; and
an array of dielectric structures between the waveguide above the substrate, each dielectric structure in the array of dielectric structures separating a corresponding pair of electrodes in the array of electrodes.

2. The field programmable spin array of claim 1, wherein the electrodes in the array of electrodes are configured to apply electric fields to color centers in the array of color centers and the array of dielectric structures is configured to localize the electric fields in the waveguide.

3. The field programmable spin array of claim 2, wherein the color centers comprise nitrogen vacancies and the dielectric structures comprise $HfO_2$.

4. The field programmable spin array of claim 2, wherein the array of electrodes comprises one pair of electrodes per color center in the array of color centers.

5. The field programmable spin array of claim 2, wherein the electric fields mediate spin coupling between the color centers and at least one optical mode guided by the waveguide.

6. The field programmable spin array of claim 2, wherein the electric fields enable selective coupling of a mode propagating in the waveguide to one of the color centers.

7. The field programmable spin array of claim 1, wherein the dielectric structures in the array of dielectric structures are piezoelectric dielectric structures, the electrodes in the array of electrodes are configured to apply voltages to the piezoelectric dielectric structures, and the piezoelectric dielectric structures are configured to apply strain to color centers in the array of color centers in response to the voltages.

8. The field programmable spin array of claim 7, wherein the color centers comprise silicon vacancies and the piezoelectric dielectric structures comprise AlN.

9. The field programmable spin array of claim 7, wherein the array of electrodes comprises two pairs of electrodes per color center in the array of color centers.

10. The field programmable spin array of claim 7, wherein the strain mediates spin coupling between the color centers and at least one optical mode guided by the waveguide.

11. The field programmable spin array of claim 1, wherein the waveguide is a diamond waveguide and the array of color centers is an array of nitrogen vacancies in the diamond waveguide.

12. The field programmable spin array of claim 1, wherein the array of dielectric structures is a periodic array of dielectric structures that forms, with the waveguide, a slow-light photonic crystal waveguide.

13. The field programmable spin array of claim 1, in combination with a tree of Mach-Zehnder interferometers.

14. An apparatus comprising:
an optomechanical crystal defining a mechanical resonator strain-coupled to an optical resonator; and
a color center embedded in the optomechanical crystal and resonant with the mechanical resonator.

15. The apparatus of claim 14, wherein the optomechanical crystal is patterned with elliptical holes having major and minor axes that vary as a function of distance from a center of the optomechanical crystal.

16. A method comprising:
transferring a state of a color center embedded in a optomechanical crystal to a mechanical mode of a mechanical resonator formed in the optomechanical crystal;
transferring the state of the color center from the mechanical mode of the mechanical resonator to an optical mode of an optical resonator; and
reading the state of the color center from the optical mode of the optical resonator.

17. The method of claim 16, wherein transferring the state of the color center to the mechanical mode occurs via strain coupling.

18. The method of claim 16, wherein transferring the state of the color center to the optical mode occurs via strain coupling.

* * * * *